(12) United States Patent
MacDonald

(10) Patent No.: US 10,779,022 B2
(45) Date of Patent: Sep. 15, 2020

(54) SYSTEMS AND METHODS FOR DETECTING AND REPORTING RECORDING STATUS

(71) Applicant: Axon Enterprise, Inc., Scottsdale, AZ (US)

(72) Inventor: David Neil MacDonald, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 42 days.

(21) Appl. No.: 16/003,981

(22) Filed: Jun. 8, 2018

(65) Prior Publication Data

US 2019/0356934 A1  Nov. 21, 2019

Related U.S. Application Data

(60) Provisional application No. 62/673,339, filed on May 18, 2018.

(51) Int. Cl.
| | | |
|---|---|---|
| H04N 21/2365 | (2011.01) | |
| H04N 7/18 | (2006.01) | |
| H04N 5/44 | (2011.01) | |
| H04N 5/91 | (2006.01) | |

(52) U.S. Cl.
CPC ....... *H04N 21/2365* (2013.01); *H04N 5/4403* (2013.01); *H04N 5/91* (2013.01); *H04N 7/181* (2013.01)

(58) Field of Classification Search
CPC ...... H04N 21/236; H04N 5/4403; H04N 5/91; H04N 7/181
USPC .......... 386/337, 201, 241; 348/143; 709/218
See application file for complete search history.

(56) References Cited

U.S. PATENT DOCUMENTS

| | | | |
|---|---|---|---|
| 9,369,635 B1 * | 6/2016 | Hilla | ...................... H04N 5/265 |
| 2002/0131768 A1 | 9/2002 | Gammenthaler | |
| 2003/0081121 A1 * | 5/2003 | Kirmuss | ................. B60R 11/02 348/143 |

(Continued)

OTHER PUBLICATIONS

International Searching Authority, International Search Report and Written Opinion for International Application No. PCT/US2018/036725 dated Feb. 14, 2019.

*Primary Examiner* — Thai Q Tran
*Assistant Examiner* — Stephen R Smith
(74) *Attorney, Agent, or Firm* — Lawrence Letham

(57) ABSTRACT

System and methods for aligning event data recorded by recording devices. Recording devices create, transmit, and store alignment data. Alignment data created by a recording device is stored in the memory of the recording device with a time that is maintained by the recording device and that is relative to the time of event data recorded by the recording device that creates the alignment data.

Recording devices further receive and store transmitted alignment data. Alignment data received by a recording device is stored in the memory of the recording device with a time that is maintained by the receiving recording device and that is relative to the time of event data recorded by the recording device that creates alignment data.

Stored alignment data may be used to align the playback of event data of devices that have the same alignment data. Alignment data may include information as to the recording status of the device that transmits the alignment data. Recording status may be reported.

20 Claims, 9 Drawing Sheets

(56) References Cited

U.S. PATENT DOCUMENTS

| | | | |
|---|---|---|---|
| 2006/0133476 A1 | 6/2006 | Page et al. | |
| 2015/0050003 A1* | 2/2015 | Ross | G11B 27/11 |
| | | | 386/201 |
| 2015/0086175 A1 | 3/2015 | Lorenzetti | |
| 2015/0312354 A1* | 10/2015 | Boyle | H04N 21/21805 |
| | | | 709/219 |
| 2016/0042767 A1* | 2/2016 | Araya | G11B 19/02 |
| | | | 386/201 |
| 2016/0286156 A1* | 9/2016 | Kovac | H04N 5/772 |
| 2017/0169128 A1* | 6/2017 | Batchu Krishnaiahsetty | |
| | | | H04N 1/32122 |
| 2017/0214982 A1* | 7/2017 | Cowherd | H04N 21/8549 |
| 2017/0230605 A1* | 8/2017 | Han | H04N 5/77 |

* cited by examiner

SYSTEMS AND METHODS FOR DETECTING AND REPORTING RECORDING STATUS

FIELD OF INVENTION

Embodiments of the present invention relate to recording device that record data related to an event.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF INVENTION

Figure 1:
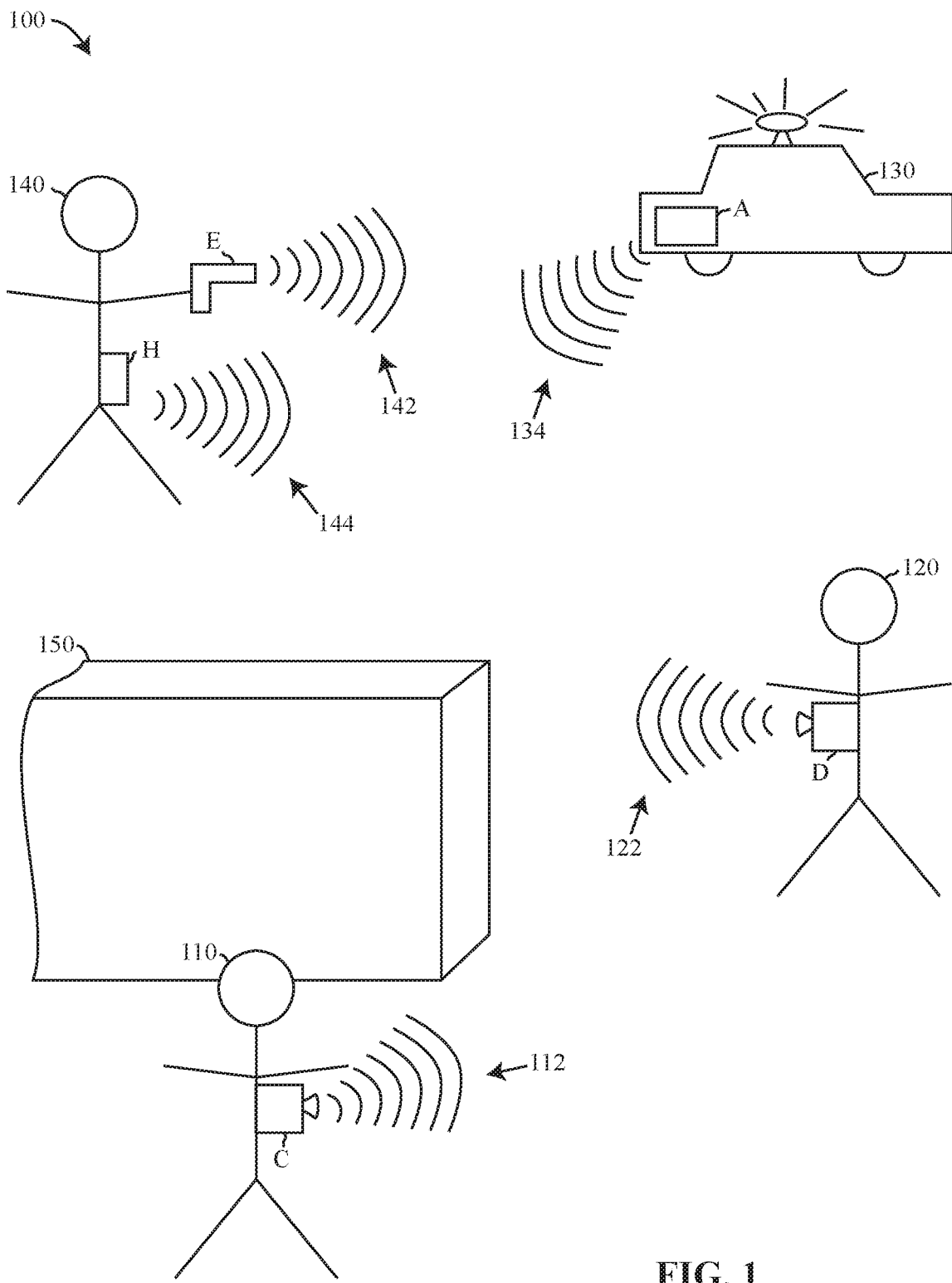
FIG. 1 is a diagram of recording devices at a location of an event transmitting and receiving alignment data according to various aspects of the present disclosure.

Recording devices may be used to record an event (e.g., incident). Recording devices at the scene (e.g., location) of an incident are becoming more ubiquitous due the development of body-worn cameras, body-worn wireless microphones, smart phones capable of recording video, and societal pressure that security personnel, such as police officers, carry and use such recording devices.

While multiple recording devices record the same incident, each recording device likely captures and records (e.g., stores) the occurrences of the event from a different viewpoint. When analyzing the event data recorded by the various recording devices, it is useful to align the event data so that the different occurrences as recorded from the various viewpoints are presented at the same time (e.g., synchronously).

Aligned playback of event data helps the analyst better understand the occurrences of the event. Knowing that the event data recorded by one recording device is aligned to the event data recorded by another recorded device provides the analyst confidence that an occurrence in the playback from one recording device is related to the occurrence in the playback from other recording devices. Aligning the event data for playback provides a more complete understanding the event because the same actors and objects of the event may be seen from different viewpoints, but at the same moment in time.

It is also helpful if the event data recorded by different recording devices is aligned to within a predetermined tolerance to improve the aligned presentation of video and audio playback for different devices. For example, aligning the audiovisual data from one recording device with the audiovisual data from another recording device to within about 90 milliseconds or less provides playback where the same audiovisual occurrences from the different recording devices are presented sufficiently close in time to each other so that a human viewer does not notice a difference in presentation between the recording devices.

Data from various recording devices may be aligned by relating all recorded data to a master time or transmitting timestamps between devices; however, a master clock or transmitting timestamps create overhead of diminishing returns as the number of recording devices at an incident increases.

Alignment data that does not include time or any indication of time may be broadcast in a beacon from one device to other devices. A beacon that includes alignment information may be referred to as an alignment beacon. Upon broadcasting an alignment beacon, the broadcasting device records the alignment data in its own memory. Along with the alignment data, the broadcasting device records the current (e.g., present) time as maintained (e.g., tracked, measured) by the broadcasting device. Maintaining time means to track the elapse of time, to track the advance of time, to detect the passage of time, or to maintain a current time. For example, a clock maintains the time of day. The time recorded by the broadcasting device relates the alignment data to the event data being recorded by the broadcasting device at the time of broadcasting the alignment data.

A recording device that receives an alignment beacon records the alignment data. The receiving device also records its current time as maintained by the receiving recording device. The time recorded by the receiving device relates the received alignment data to the event data being recorded by the receiving recording device at the time of receipt of the alignment beacon.

Even though no value of time is transmitted by a broadcasting recording device or received by a receiving recording device, the alignment data relates a point in time in the event data recorded by the broadcasting device to a point in time in the event data recorded by the receiving device. Even if the current time maintained by the broadcasting device and the receiving device is very different from each other, because the alignment data relates to a particular portion (e.g., certain time) of the event data recorded by the transmitting device and to a particular portion of the event data recorded by the receiving device, the event data from the two devices are related by the alignment data and may therefore be aligned in playback.

In operation, each recording device periodically transmits an alignment beacon. A portion of the data of each alignment beacon transmitted is different from the data of all other alignment beacons transmitted by the same recording device or any other recording device. Data from each transmitted alignment beacon is stored by the transmitting device along with a time that relates the alignment data to the event data in process of being recorded by the recording device at the time of transmission or thereabout. Alignment data may be stored with or separate from the event data that is being captured and stored (e.g., recorded) by the recording device. A recording device may transmit many beacons while recording an event.

A recording device may receive alignment beacons from one or more other recording devices. The receiving device records the alignment data from the received alignment beacon. The alignment data from each received alignment beacon is stored with a time that relates the alignment data to the event data in process of being recorded at the time of receipt of the alignment beacon or thereabout. Received alignment data may be stored with or separate from the event data that is being recorded by the receiving recording device. A recording device may receive many alignment beacons from many other recording devices while recording an event.

The event and alignment data recorded by a recording device may be uploaded to a server. A server that receives event and alignment data from recording devices may be referred to as an evidence manager. The server may search (e.g., inspect, analyze) the data from the various recording devices to determine whether the event data recorded by one recording device relates to the event data recorded by other recording devices. Because a recording device that transmits an alignment beacon records the transmitted alignment data in its own memory and a recording device that receives the alignment beacon records the same alignment data in its own memory, a server may detect related event data by searching for alignment data that is common to the event data from two or more devices.

Once a server has identified recording devices that transmitted and received beacons from each other, the server may use the alignment data recorded by the respective devices to align the event data from the various recording devices for aligned playback.

Alignment of event data is not limited to alignment after upload or by postprocessing. During live streaming, recording devices may provide event and alignment data. During presentation of the event data, the alignment data may be used to delay the presentation of one or more steams of event data to align the event data during the presentation.

Stored alignment data is not limited in use to aligning event data from different recording devices for playback. Alignment data may be used to identify an event, a particular operation performed by a recording device, and/or related recording devices.

Alignment data may also include the serial number of the device that transmitted the alignment beacon. The alignment data from one or more recording devices may be search to determine whether those recording devices received alignment beacons from a particular recording device. Alignment data from many recording devices may be searched to determine which recording devices received alignment beacons from each other and a possible relationship between the devices, or a relationship between the devices with respect to an event.

Further, recording devices may be issued, owned, or operated by a particular security agency (e.g., police force). The agency may operate and/or maintain servers that receive and record information regarding events, agency personnel, and agency equipment. An agency may operate and/or maintain a dispatch server (e.g., computer) that dispatches agency personnel to events, receives incoming information regarding events, and information from informants. The information from an agency server and/or a dispatch server may be used in combination with the data recorded by recording devices, including alignment data, to gain more knowledge regarding the occurrences of an event, the personnel that recorded the event, and/or the role of a recording device in recording the event.

Alignment beacons may also provide information as to the recording status of recording devices at an incident. Alignment beacons transmitted by a recording device may include information as to the recording status of the camera (e.g., recording, buffering, not recording). Beacons not related to and/or separate from alignment beacons (e.g., do not include information for aligning) may also transmit information as to the recording status of a recording device. Beacons that include recording status may be transmitted at any time and/or at any rate. In an implementation, the recording status is included in the alignment beacons and are transmitted at the rate described herein with respect to alignment beacons.

Recording devices that receive beacons from other devices may determine the recording status of the devices that send the beacons. A recording device may collect recording status information. A recording device may track other recording devices from which the recording device receives beacons. A recording device may keep a historical record of the other recording devices from which the recording device receives beacons. A historical record may be provided to a server for long-term storage. A server may create a historical record by extracting recording status from stored alignment beacons.

The recording device may store information that identifies, possibly uniquely (e.g., serial number), other recording devices from which the recording device receives beacons. A recording device may detect an absence of beacons from other recording devices that previously sent one or more beacons. A recording device may track a lapse of time from the last received beacon from other recording devices. Absence of beacons from a particular recording device may be construed as evidence that the particular device is no longer recording or is in wireless range for transmitting beacons. Absence of beacons from a particular recording device for a predetermined amount of time may be construed as evidence that the particular device is no longer recording.

Information recorded and/or tracked by a recording device regarding the recording status may be reported. A first recording device may report its own recording status and/or the recording status of other devices in any manner. Reporting includes transmitting a message and/or providing a signal. A report may include the recording status of each recording device individually. A report may include the recording status of one or more recording devices in combination. A report may include a Boolean combination (e.g., calculation, determination) of the recording status of one or more recording devices. A Boolean combination may include the result any Boolean function. A Boolean combination may include determining when any one recording device is recording. A Boolean combination may include determining when no recording device is record and at least one recording device is buffering. A Boolean combination may include determining when the device performing the Boolean calculation is not recording, but at least one other recording device is recording. A Boolean combination may include determining when all recording devices are buffering. A Boolean combination may include determining when all recording devices are not recording. A Boolean combination may include determining that some recording devices are not recording and that a beacon has not been received from other recording devices for a period of time.

For example, a first recording device may provide information regarding recording status to a user. A first recording device may report some or all of the information regarding recording status to an electronic device (e.g., smart phone, tablet, mobile computer, server). The first recording device may communicate with another electronic device in any manner (e.g., wired, wireless). An electronic device may provide information (e.g., via screen of smart phone, tablet, mobile computer) regarding the recording status of the first recording device and/or any other recording device from which the first recording device receives or has received a beacon. A first recording device may provide recording status information directly to a user visually (e.g., LEDs, display), audibly (e.g., speaker), and/or by tactile (e.g., haptic, vibrations) transmission.

A first recording device may determine when the first recording device is not recording. In an implementation, when a recording device is not recording it is buffering captured information, so detecting that a recording device is buffering is equivalent to detecting that the recording device is not recording. A first recording device may determine when all other recording devices within wireless transmission range are not recording. A first recording device may report when no recording devices are recording in the vicinity (e.g., wireless range) of the first recording device. When no recording devices are recording in the vicinity of the first recording device, the likelihood that the words or actions of the user of the first recording device will be recorded is low.

Police officers may benefit from receiving a report (e.g., notice) that no recording device in the vicinity is recording. A times after an incident or during a break (e.g., lunch, coffee break), police officers wish to discuss the incident or personal information without fear that their discussion will be recorded and possibly made public. A first recording device that reports to the officer that the first recording device is not recording and none of the recording devices in the vicinity are recording will provide the officer confidence that his private conversations will not be recorded.

For example, recording devices at event 100 of FIG. 1 include a conducted electrical weapon ("CEW") identified as recording device E, a holster for carrying a weapon identified as recording device H, a vehicle recording device in vehicle 130 that is identified as recording device A, a body-worn camera identified as recording device C, and another body-worn camera identified as recording device D.

Recording devices E, H, and A may perform one or more functions in addition to recording event data. Additional functions may include, for example, operation as a weapon (e.g., CEW), holding a weapon (e.g., holster), and detecting the operations of a vehicle (e.g., vehicle recording device).

User 140 carries CEW E and holster H. Users 120 and 110 respectively wear cameras D and C. Users 110, 120, and 140 may be personnel from a security agency. Users 110, 120, and 140 may be from the same agency and may have been dispatched to event 100.

CEW E may operate as a recording device by recording the operations performed by the CEW such as arming the CEW, disarming the CEW, and providing a stimulus current to a human or animal target to inhibit movement of a target. Holster H may operate as a recording device by recording the presence or absence of a weapon in the holster. Vehicle recording device A may operate as a recording device by recording the activities that occur with respect to vehicle 130 such as the driver's door opening, the lights being turn on, the siren being activated, the trunk being opened, the back door opening, removal of a weapon (e.g., shotgun) from a weapon holder, a sudden deacceleration of vehicle 130, and/or the velocity of vehicle 130. Camera C and D may operate as recording devices by recording audiovisual information (e.g., data) regarding the happenings (e.g., occurrences) at event 100. The information captured and stored (e.g., recorded) by a recording device regarding an event is referred to herein as event data.

A recording device may periodically transmit an alignment beacon. An alignment beacon may be transmitted using any wireless communication protocol. Wireless radio communication protocols include Bluetooth, Zigbee, WAP, WiFi, NFC, IrDA, LTE, BLE, EDGE, EV-DO. Wireless communication may include transmissions and/or reception using light and/or sound. Preferably, wireless communication may occur between devices that are proximate (e.g., within 100 meters) to each other so that the event and alignment data recorded by the recording devices are related to the same incident.

Transmission of an alignment beacon may be accomplished in a manner that does not require a one-to-one communication link or association between the transmitting device and the receiving device. For example, the term broadcast is used to mean a transmission that is transmitted without regard as to the device that receives the beacon and/or without expecting of or waiting for acknowledgement from a device that receives the transmission. A broadcast may be described as being a one to many transmission. A broadcast may further refer to a transmission that is "fire-and-forget" meaning that there is no expectation of a response from a receiving device. The term transmission or transmit, as used herein, refers to a one-to-many, fire-and-forget transmission unless expressly stated otherwise.

The term a communication link means a channel by which devices communicate whether the communication is one-to-one or one-to-many. Communicate means transmission and/or reception of data. Data may be communicated using a communication protocol that packetizes the data for transmission. Alignment information may be included as part of a data packet. An alignment beacon may include a packet of information that includes alignment data.

For example, recording devices A, C, D, E, and H are shown broadcasting one or more alignment beacons wirelessly via communication links 134, 112, 122, 142, and 144 respectively using a wireless communication protocol. Wireless transmission may be directional or omni-directional. Preferably, recording devices transmit alignment beacons omnidirectionally. Although communication links 134, 112, 122, 142, and 144 are shown as transmitting in what appears to be a single direction, recording devices A, C, D, E, and H transmit omnidirectionally.

A recording device may receive one or more alignment beacons. A recording device may receive all beacons send by another recording device or only a portion of the beacons transmitted by the recording device. Objects (e.g., walls, buildings) at the location of an event may interfere with transmission or reception of one or more alignment beacons by a particular device.

For example, CEW E, holster H, vehicle recording device A, and body-worn camera D all appear to be in sight of each other, so there should be no impediment to each recording device receiving most if not all of the beacons transmitted by the other recording devices. Body-worn camera C is positioned behind wall 150 away from user 140 and vehicle 130. It is possible that CEW E, holster H, and vehicle recording device A cannot receive the transmissions from body-worn camera C. Transmission between body-worn cameras C and D do not appear to be obstructed.

With respect to recording status, vehicle recording device A and body-worn camera D appear to be in sight of each other, so there should be no impediment to each recording device receiving most if not all of the beacons transmitted wirelessly by the other recording device. So, recording device A should be able to detect, store, and/or report its own recording status and the recording status of body-worn camera D. Body-worn camera C is positioned behind wall 150 away from vehicle 130, so recording device A may not be able to receive beacons from body-worn camera C. So, recording device A may not be able to detect, store, and/or report the recording status of body-worn camera C. Further, because recording device A cannot receive beacons from body-worn camera C, it is not likely that body-worn camera C would be able to capture and record information regarding vehicle 130 due to obstruction by wall 150.

Body-worn camera D may receive beacons from recording device A and body-worn camera C. So, body-worn camera D may detect, store, and/or report its own recording status and the recording status of recording device A and body-worn camera C.

Body-worn camera C may receive beacons from body-worn camera D. So, body-worn camera C may detect, store, and/or report its own recording status and the recording status of body-worn camera C. As discussed above, wall 150 likely obstructs transmissions from recording device A, so body-worn camera C cannot detect, store, and/or report the recording status of recording device A.

Each recording device maintains its own time. A recording device may include a real-time clock or a crystal for maintaining time. The time maintained by one recording device may be independent of all other recording devices. The time maintained by a recording device may occasionally be set to a particular time by a server or other device; however, due to drift the time maintained by each recording device cannot be guaranteed to be the same.

A recording device uses the time that it maintains, or a derivative thereof, to progressively mark event data as event data is being recorded. Marking event data with time indicates the time at which that portion of the event data was recorded. For example, a recording device may mark the start of event data as time zero, and record a time associated with the event data for each frame recorded so that the second frame is recorded at 33.3 milliseconds, the third frame at 66.7 milliseconds and so forth assuming that the recording device records video event data at 30 frames per second.

In the case of a CEW, the CEW would maintain its time and record the time of each occurrence of arming the device, disarming the device, and providing a stimulus signal.

The time maintained by a recording device to mark event data may be absolute time (e.g., UTC) or a relative time. In one example, the time of recording video data is measured by the elapse of time since beginning recording. The time that each frame is recorded is relative to the time of the beginning of the recording. The time used to mark recorded data may have any resolution such as microseconds, milliseconds, seconds, hours, and so forth.

Figure 2:
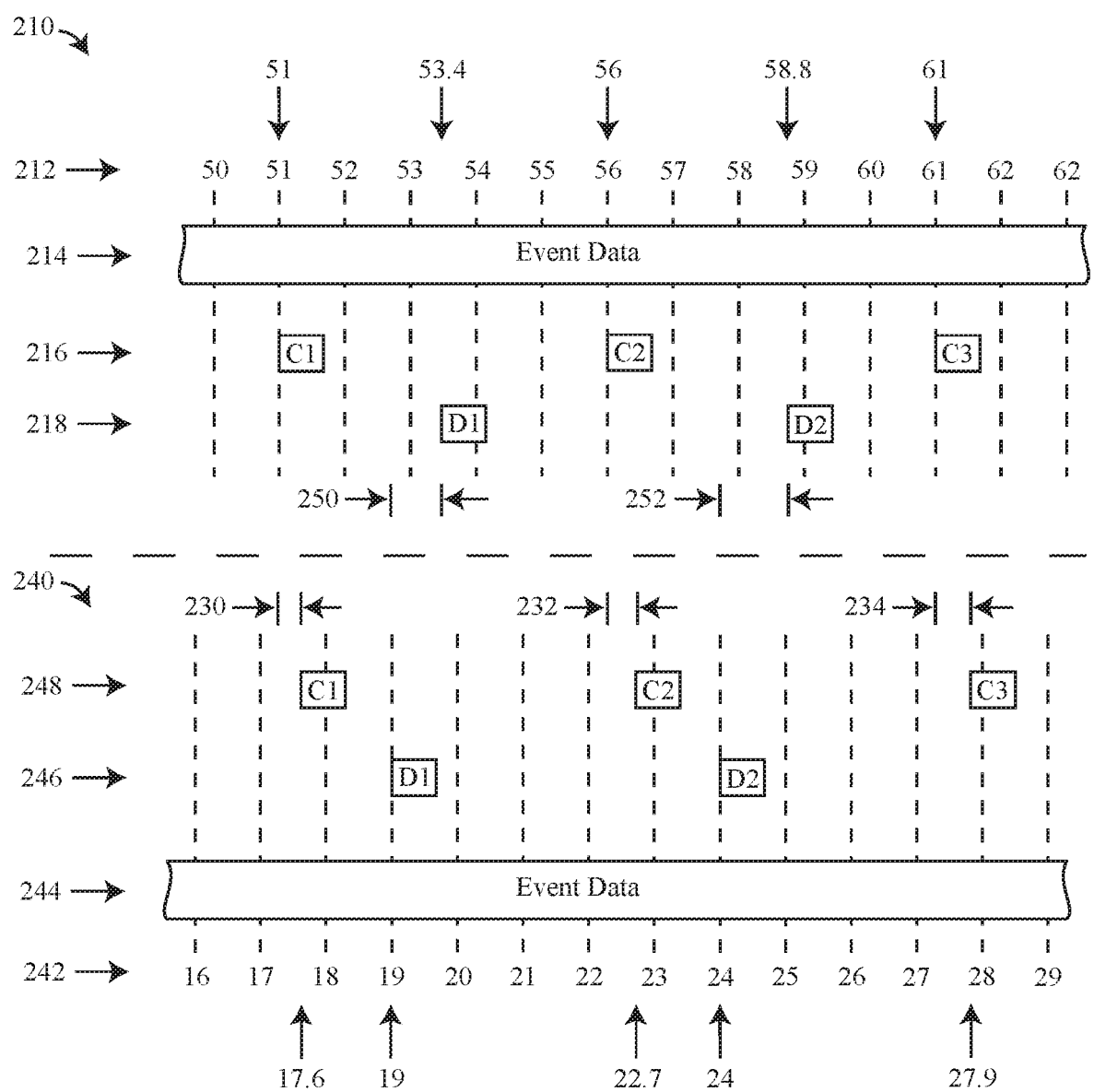
FIG. 2 is a diagram of the transmission and reception of alignment data by two recording devices.

For example, referring to FIG. 2, a first recording device (e.g., recording device C) transmits alignment beacons that include alignment data C1, C2, C3, and so forth, receives alignment beacons that include alignment data D1, D2, and so forth, records event data 214, and tracks time 212. Data 210 recorded by recording device C includes time 212, event data 214, transmitted alignment data 216, and received alignment data 218.

A second recording device (e.g., recording device D) transmits alignment beacons that include alignment data D1, D2, and so forth, receives alignment beacons that include alignment data C1, C2, C3, and so forth, records event data 244, and tracks time 242. Data 240 recorded by recording device D includes time 242, event data 244, transmitted alignment data 246, and received alignment data 248.

Event data, 214 and 244, is captured and recorded data regarding an event. Each recording device may maintain its own time using a real-time clock, an oscillator, a processing circuit, or any other suitable circuit. As discussed above, the time used to mark the time of recording event data may be an absolute time (e.g., time of day, UTC) or a relative time for example the elapsed time from the start of recording event data.

Recording device C maintains time 212 while recording device D maintains time 242. Recording device C uses time 212 to mark the time of recording event data 214 as event data 214 is recorded. Recording device D uses time 242 to mark the time of recording event data 244 as event data 244 is recorded. Recording device D uses time 242 to mark the time of recording event data 244 as event data 244 is recorded. In this example, there is no relationship between the time maintained by recording device C and recording device D, so time 212 is separate from and operates independent of time 242. Each recording devices has separate circuity for maintaining its own time for its own operation.

In a recording device, the time maintained by the recording device is also used to mark (e.g., identify) the time of occurrences related to alignment data. For example, the time maintained by a recording device may be used to mark transmission of an alignment beacon, storage of alignment data in the memory of the recording device, and/or receipt of an alignment beacon. The time used to mark the event data recorded by a recording device is also used to mark alignment data so that the time maintained by the recording device associates (e.g., relates) alignment data to the event data. In particular, the time maintained by the recording device may relate alignment data to a specific time of recording event data.

For example, referring to FIG. 2, recording device C prepares or transmits an alignment beacon that includes alignment data C1 at time 51 with respect to time 212. Recording device C also stores a copy of alignment data C1. The time alignment data C1 was prepared or transmitted, in this example, time 51, is also recorded with alignment data C1 in the memory of recording device C. The time maintained by the transmitting recording device, in this example time 51, relates the preparation or transmission of alignment data C1 to the event data recorded in event data 214 at the same time 51.

A recording device may also receive and record alignment data. A recording device that receives alignment data records a time, based on the time maintained by the recording device of the receipt or storage of the alignment data. For example, referring to FIG. 2, recording device D receives an alignment beacon that includes alignment data C1. Recording device D stores a copy of alignment data C1. The time alignment data C1 was received or stored by recording device D, time 17.6 with respect to time 242, is also recorded with alignment data C1 in the memory of recording device D. The time maintained by the receiving recording device, in this example time 17.6, relates the receiving or storing of alignment data C1 to the event data recorded in event data 244 at the same time 17.6.

Relating the respective times of the two recording devices C and D to alignment data C1 relates event data 214 to alignment data C1, alignment data C1 to event data 244, and thereby relates event data 214 to event data 244 at particular times relative to the respective devices.

The creation, storing, transition, and reception of alignment data is discussed in further detail below.

As discussed above, an alignment beacon may be any type of transmission, signal, or packet used by a conventional wireless communication protocol to transmit information that includes alignment data. In an implementation, a Bluetooth Low Energy ("BLE") advertisement is used to transmit alignment data. Alignment data refers to the data that is added (e.g., payload) to the data of a conventional transmission. For example, alignment data may be added as a payload to a conventional data packet that is transmitted. A transmission that includes alignment data is referred to herein as a beacon or an alignment beacon. A beacon may be broadcast to many devices or transmitted to a specific device.

Figure 4:
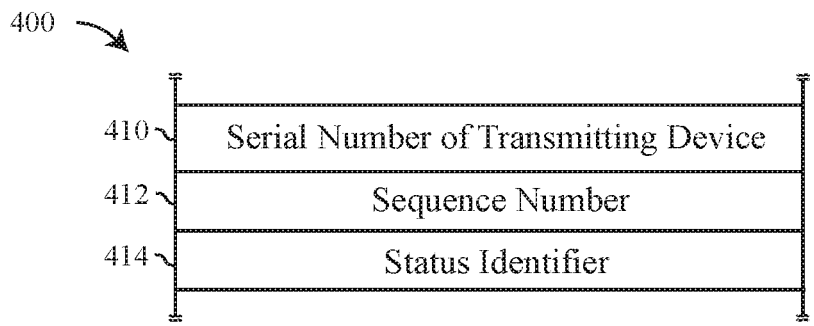
FIG. 4 is a diagram of alignment data created and transmitted by a recording device.
Figure 5:
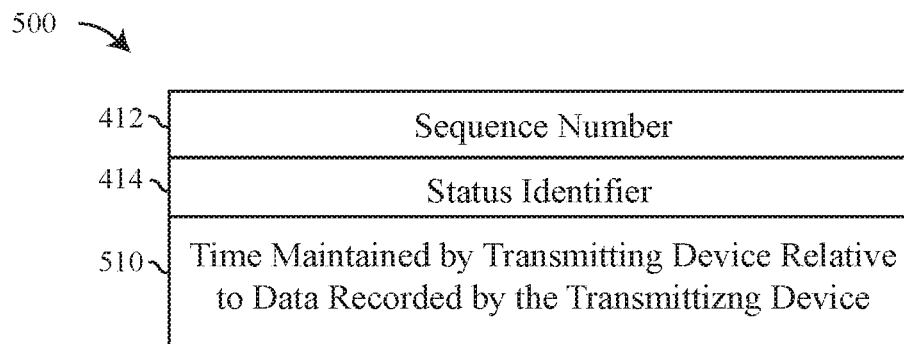
FIG. 5 is a diagram of alignment data stored by a recording device for each alignment beacon transmitted.
Figure 6:
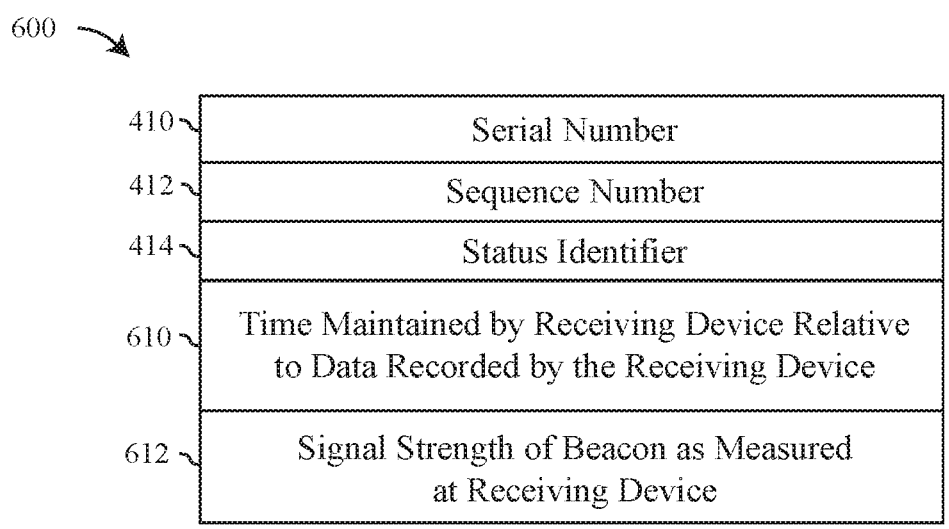
FIG. 6 is a diagram of alignment data stored by a recording device for each alignment beacon received.

Referring to FIG. 4, alignment data (e.g., 400) may include the serial number (e.g., 410) of the recording device creating and transmitting the alignment beacon, a sequence number (e.g., 412) identifying the sequence of alignment data created by a recording device, and a status identifier (e.g., 414). The recording device that creates the alignment data transmits the alignment data in an alignment beacon.

A serial number includes any alphanumeric number that identifies a recording device. A serial number may include a 32-bit number. A serial number may uniquely identify recording devices so that no recording devices have the same serial number. A serial number may include data that identifies the type (e.g., body camera, CEW, holster, vehicle) of the recording device. A serial number may be used to identify a recording device that prepares and transmits an alignment beacon. Alignment data may omit the status identifier and still be useful for aligning event data.

For example, referring to FIG. 2, recording device C generates and transmits alignment data C1, C2, and C3. The serial number in alignment data C1, C2, C3, and so forth is the serial number of recording device C (e.g., 0xE603D04F). Recording device D generates and transmits alignment data D1, D2, and so forth. The serial number in alignment data D1, D2, and so forth is the serial number of recording device D (e.g., 0xE603A193).

A sequence number identifies alignment data that is created and transmitted. While recording an incident, a recording device may transmit two or more alignment beacons. The sequence number for the alignment data for each alignment beacon is different so that the alignment data may be distinguished from each other. A sequence number servers the purpose of counting the alignment data created and the alignment beacons transmitted by a recording device. A sequence number may include a 32-bit number. A sequence number may be incremented after the creation of each alignment data 400. A sequence number may be reset at the start of a new incident or the sequence number may never be reset so that alignment data sequences of different incidents may be distinguished from each other.

For example, referring to FIG. 2, recording device C transmits alignment beacons that include alignment data C1, C2, and C3 at times 51, 56, and 61 respectively with respect to time 212. The sequence number is different in alignment data C1, C2, and C3. The sequence number may start at a value in alignment data C1 and be incremented from C1 onward for each alignment data thereafter. For example, the value of sequence number 412 for alignment data C1, C2, and C3 may be 0x00000083, 0x00000084, and 0x00000085 respectively. Each time alignment data is generated, the sequence number is incremented to show the sequence of alignment data while recording an incident. The sequence number identifies the order of creation of alignment data.

A status identifier identifies the status (e.g., state of operation, mode, state) of a recording device. Each recording device performs specific functions. The status identifier relates to the function being performed at the time of creation of the alignment data.

For example, the status of a CEW may include the operations of disarmed, armed, and stimulus. When a CEW operates in the disarmed mode, the safety of the CEW is on. When a CEW operates in the armed mode, the safety of the CEW is off. While the CEW operates in the stimulus mode, the CEW is providing a stimulus signal.

A status of a holster may include the inserted mode while a weapon is inserted into the holster and a removed mode while the weapon is removed from the holster.

The activities identified above that are related to a vehicle may identified the status of a vehicle. The status may include driver's door opening, the lights being turn on, the siren being activated, the trunk being opened, the back door opening, a weapon (e.g., shotgun) being removed from a cradle, a sudden deacceleration, and/or the velocity of the vehicle over a limit.

The status of a body-worn camera may include the operations of recording, not recording, and pre-event buffering.

The operating status of a recording device may be monitored. The status of a recording device may be tracked using a binary number (e.g., status number, status register). Each bit of the binary number may relate to one operating mode of the recording device. Each time the devices is operating in the mode associated with a particular bit of the binary number, that bit is set to a value of one. Each time the recording device ceases to operate in the mode associated with the particular bit of the binary number, that bit is set to a zero. Some modes of a recording device may be mutually exclusive while other modes may occur at the same time. The number of bits of the status identifier relates to the number of operating modes of the recording device.

Status identifier 414 of alignment data 400 relates to the status of the recording device. The status identifier may include the binary number used to represent the current operating state of the recording device. Each time alignment data is prepared for transmission, the value status identifier 414 may be equal to the binary number that tracks the operating states of the recording device. A status identifier that identifies the operating state of the recording device at the time of creation of alignment data provides information as to operation of the recording device while recording an incident. As the status of the recording device changes, the value of the status identifier also changes thereby providing a record over time of the operation of the recording device. The status identifier combined with the sequence number may be used to identify the status of the recording device over time and at a particular time with respect to the respective clocks of the device.

For example, the status of the above vehicle recording device may be an 8-bit number where the bits from MSB to LSB correspond to driver's door open, lights on, siren active, trunk open, back door open, weapon removed, sudden deacceleration, and velocity over a limit. The value of the vehicle status is 0x80 when the only activity detected is the front door open. The value of the status is 0x61 when the lights are on, the siren is active, and the vehicle is moving over a limit. The value is 0x00 when the driver's door is closed, the lights are off, the siren is not active, the trunk is closed, the back door is closed, the weapon is not removed, the vehicle is not suddenly deaccelerating, and the velocity of the vehicle is not over a limit.

In this example, status identifier 414 for a vehicle recording device would be the value of the 8-bit status at the time of generating the alignment data.

Status identifier 414 may include the recording status of the recording device. Recording status identified in identifier 414 may include recording, buffering, and not recording. The status recording means that the recording devices is presently capturing and recording information. The status buffering means that the recording device is capturing information but is recording the information in a temporary buffer (e.g., circular buffer, pre-event buffer). The information in the temporary buffer is not recorded permanently unless the recording device transitions to recording. Information in the temporary buffer may be overwritten before the recording device switches from buffering status to recording status. A buffer may store information of a limited duration (e.g., 30 seconds, 1 minute), so information captured only with in the last limited duration would be permanently recorded when the recording device switches to recording status. The status not recording means that the recording device is not capturing information for storage or in the temporary buffer. Not recording means that the recording device is not storing captured information in any form. A recording device that is in the recording state, the buffering state or the not recording state may receive and record beacon from other devices such as beacons regarding recording status. An absence of beacons from a recording device may indicate that the recording device is not recording because it is turned off.

In another embodiment, the status identifier may be a 64-bit pseudorandom number. Each time the operating status of a recording device changes, the recording device generates a new pseudorandom number. A recording device may store in its memory the operating status that relates to each pseudorandom number. Associating the operating status of a recording device to a pseudorandom number relates each operating state of the recording device to a number that is likely unique with respect to all status identifier numbers for that recording device and likely for all other recording devices.

For example, if two body-cameras are both in the recording data, status identifier 414 will be the same for both devices if the value from the status register is used for status identifier 414. If the status of the body-cameras is represented by a pseudorandom number, status identifier 414 for the body-cameras will likely be different.

Using pseudorandom numbers to identify the operating state of each recording device uniquely or very likely uniquely identifies the operating state of one recording device from the operating states of all other recording devices.

Uniquely or nearly uniquely identifying the operating status of recording devices provides the benefit of being able to search a large database that includes the recorded event data and alignment data from many devices for a specific state of a specific recording device that occurred at a specific time. Uniquely identifying operating states may further aid in identifying specific incidents.

For example, suppose that when CEW E is armed, it generates a pseudorandom number associated with the state of being armed. Each alignment beacon transmitted by CEW E includes the pseudorandom number as status identifier 414 during the duration of time that CEW E is armed. When CEW E record alignment data in its memory, the pseudorandom number for that armed state will be recorded and associated to a time in the event data. Each recording device (e.g., A, H, D) that receives alignment beacons from CEW E will record the same pseudorandom number with a time that relates the pseudorandom number to the event data recorded by the receiving device.

When the data recorded by all of the recording devices is transferred to a server, the server may search the recorded data for the pseudorandom number that represents the arming of CEW E. The search will identify the event data recorded by recording devices A, H, and D because they received and recorded the pseudorandom number when they recorded alignment data from CEW E. Because devices (e.g., A, H, D) stored the same pseudorandom number, they likely were present at and recording the same incident. Data from other sources, such as a dispatch server, may identify the particular incident and relate the pseudorandom number to that incident.

Because the pseudorandom number that represents the armed state of CEW E is likely unique in the database, the server may quickly search a large database to identify the recorded data from the various devices related to arming CEW E and the incident that lead to arming CEW E. Further, the pseudorandom number may be used to identify, at least partially, the recorded data and recording devices associated with the incident that lead to arming CEW E.

Representing the status of a recording device as a pseudorandom number may facilitate identifying specific recording devices and specific recorded data in a large database that includes the recorded data from many devices over what could be a long period of time (e.g., years).

For example, the status of a CEW may be expressed as a 2-bit number where the bits represent, from MSB to LSB, CEW armed and stimulus active. The value of the status would be 0x0 when the CEW is not armed (e.g., safety on). The CEW can provide a stimulus signal only when the CEW is armed. The value of the status of the CEW would be 0x2 when the CEW is armed and 0x3 when the CEW is armed and the stimulus signal is active.

Each time the status of the CEW changes, the new value of the status may be associated with a pseudorandom number. For example, when the CEW is armed by switching off the safety, the value of the status of the CEW goes from 0x0 to 0x2. Responsive to the change in status, the CEW generates a pseudorandom number, for example 0x5794AC304B7F23EC, and associates it with the status value of 0x2. The recording device may store the value of the status and the pseudorandom number to identify the status associated with the pseudorandom number. When the next alignment data is generated and transmitted, the random number is transmitted as status identifier 414. As long as the status of the CEW remains the same, the value of status identifier 414 remains the same pseudorandom number regardless of how many alignment beacons are transmitted.

When the status of the CEW changes, such as when the user pulls the trigger, the value of the status changes from 0x2 to 0x3 and a new pseudorandom number, for example 0x3B8CA37D2C84F9E0, is generated and sent out as long as the status of the CEW remains unchanged. Because the pseudorandom number is long (e.g., 64-bits) it is likely that no other status from any other recording device will generate the same number. So, a server may inspect the data uploaded from the CEW, detect when the CEW was armed, then search the uploaded data from all devices for the pseudorandom number that corresponds to when the CEW was armed. By searching for this single pseudorandom number, the server may identify every device that was proximate to and/or received an alignment beacon from the CEW while it was armed.

Arming a CEW may be an indication that an incident is in progress, so the pseudorandom number may be a unique or likely unique identifier of the incident. A server that receives the data from recording devices may also receive data from the security services dispatch computer. The dispatch data may identify that a particular person was sent to respond to an incident. The dispatch data, or other data from the security service, may link that person with the serial number of the CEW, which produced the pseudorandom number. Using data from the agency with alignment data, it is possible to associate a pseudorandom number to a particular incident, which means that searching uploaded data for that pseudorandom number is akin (e.g., equivalent to) searching for a particular incident. Which may in turn identify recording devices that were at the incident.

Recording status may be incorporated in to a portion of a pseudorandom number. In another implementation, a new field may be added to alignment data 400 that provides information regarding the recording status of the recording device.

Returning to FIG. 2, recording device C generates and transmits alignment data C1, C2, and C3. Recording device C transmits alignment beacons that include alignment data C1, C2, and C3, referred to as alignment beacons C1, C2, and C3, at times 51, 56, and 61 with respect to time 212. Recording device D is within range of the alignment beacons transmitted by recording device C. Alignment beacons C1, C2, and C3 from recording device C are received by recording device D after delay (e.g., circuit, transit, transmission) 230, 232, and 234.

A transmission delay may include any source of delay, such as the time required to prepare the alignment data for transmission, the time for storing the alignment data in the memory of the transmitting device, the time for a communication circuit to form and transmit the beacon, the time for the beacon to travel through the medium (e.g., electromagnetic radio signal) to a receiving device, the time for a communication circuit of the receiving device to receive and decode the alignment beacon, and/or the time to store the alignment data in the memory of the receiving device.

In this example, recording device D receives beacons C1, C2, and C3 at times 17.6, 22.7, and 27.9 with respect to time 242.

Recording device D also generates alignment data D1 and D2 and transmits alignment beacons that include alignment data D1 and D2. Recording device D transmits beacons D1 and D2 at times 19 and 24 respectively with respect to time 242. Because recording device C is within range of the alignment beacons from recording device D, recording device C receives beacons D1 and D2 at times 53.4 and 58.8 with respect to time 212 after delay 250 and 252 respectively.

When a device generates or transmits alignment data, as discussed above, the device stores some or all of the alignment data and the time maintained by the device. For example, when recording device C generates and/or transmits alignment data C1, recording device C generates for transmission alignment data 400 and stores transmitted data 500 which includes sequence number 412, status identifier 414, and time 212, which is the time of generation or transmission of the alignment data.

When a recording device stores alignment data that it has generated, the recording device does not need to store its own serial number with the alignment data because when the recording device transfers its recorded data to a server, it will use its serial number to identify the provenance of the recorded data. Each time a recording device generates alignment data, the recording device stores data 500 in its memory. Data 500 includes sequence number 412 and status identifier 414 from alignment data 400 in addition to time 510, which is the time or generation or transmission of alignment data 400 or the storage of data 500 with respect to the time maintained by the recording device.

In this example of generating alignment data C1, the value of time 510 will be 51 because that is the time when alignment data C1 was generated, stored or transmitted. For this example, assume that the stored values of sequence number 412 and time 510 are 0x010D0191 and 51 respectively. Further assume that status identifier 414 is a pseudorandom number, for example 0x304AF29CB2F8E386. The status value (e.g., status register) of recording device C that resulted in the pseudorandom number may also be stored as part of transmitted data 500.

Continuing the example, when recording device C generates or transmits alignment data C2, the stored values of sequence number 412 and time 510 are 0x010D0192 and 56 respectively. Since the status of recording device C has not changed (e.g., still recording), the value of status identifier 414 remains the same value of 0x304AF29CB2F8E386.

Continuing the example, when recording device C generates or transmits alignment data C3, the value of sequence number 412 and time 510 are is 0x010D0193 and 61 respectively. Since the status of recording device C has not changed (e.g., still recording), the value of status identifier 414 remains the same value of 0x304AF29CB2F8E386.

Recording device D also generates a respective alignment data 400 for D1 and D2 and stores transmitted data 500 for D1 and D2. For example, when recording device D generates or transmits alignment data D1, the value of sequence number 412 and time 510 are X and 19 respectively. For alignment data C2, the values of sequence number 412 and time 510 are X+1 and 24 respectively. Because recording device D is in the same state (e.g., recording) while generating or transmitting beacons D1 and D2, status identifier is the same for all transmitted and stored alignment data, whether the value of the status of the recording device or a pseudorandom number.

When a recording device receives an alignment beacon, it stores alignment data 400 from the beacon with the time of receiving the beacon or recording received alignment data 600. Received alignment data 600 includes serial number 410, sequence number 412, and status identifier 414 from the transmitted alignment data 400. Data 600 also includes time 610 which is the time of receipt of the alignment beacon or the time of storing data 600. Time 610 is the time as maintained by the receiving recording device. Data 600 further includes signal strength 612, which is the signal strength (e.g., SSI) of the of the signal that transmitted the alignment beacon as detected (e.g., measured) by the receiving recording device.

For example, recording device D receives beacon C1 and stores serial number 410 (e.g., 0xE603D04F) of recording device C, sequence number 412 (e.g., 0x010D0191), and status identifier 414 (e.g., 0x304AF29CB2F8E386). Recording device D also stores time 610, which corresponds to the time of receipt or storage of alignment beacon C1 with respect to time 242. Time 242 is the time that recording device D maintains and uses to identify the time of recording event data 244, transmission of alignment data, and receipt of alignment data. In this example, the time of receipt or storage of beacon C1 by recording device D is 17.6. Recording device D may also store as signal strength 612, the signal strength (e.g., SSI) of the radio signal of alignment beacon C1 when the signal reached recording device D.

Storing the receive signal strength is optional. The status identifier may also be omitted without impairing the operation of aligning event data.

Continuing the example, from beacon C2, recording device D stores serial number 410 (e.g., 0xE603D04F), sequence number 412 (e.g., 0x010D0192), and status identifier 414 (e.g., 0x304AF29CB2F8E386). Recording device D also stores the value of time 610 as being 22.7. From beacon C3, recording device D stores serial number 410 (e.g., 0xE603D04F), sequence number 412 (e.g., 0x010D0193), and status identifier 414 (e.g., 0x304AF29CB2F8E386). Recording device D also stores the value of time 610 as being 27.9

Recording device C records the same type of data from beacons D1 and D2 in addition to its own time of receipt or storage of alignment data from D1 and D2 and the receive signal strength. Again, storing the receive signal strength is option and the status identifier may also be omitted.

As discussed above and with respect to FIG. 2, because recording device C stores transmitted data 500 for each alignment beacon transmitted and because recording device D stores received alignment data 600 for each alignment beacon received, it is possible to relate event data recorded at a specific time by recording device C to event data recorded at a specific time by recording device D. Relating a specific time in recorded event data from recording device C to a specific time in recorded event data of recording device D facilitates aligning the event data from recording device C to the event data of recording device D for synchronized playback.

For example, data 500 from beacon C1 as stored by recording device C includes:
sequence number 412 (e.g., 0x010D0191); and
time 510 (e.g., 51) as maintained by time 212.
Time 510 relates the alignment data from beacon C1 to: event data 214 that was recorded at time 51.

Data 500 as recorded by recording device C also relates to the serial number of recording device C (e.g., 0xE603D04F) because recording device C is the device that generated alignment data C1.

Data 600 from beacon C1 as stored by recording device D includes:
serial number of recording device C (e.g., 0xE603D04F);
sequence number 412 from alignment data C1 (e.g., 0x010D0191); and
time 610 (e.g., 17.6) as maintained by time 242.
Time 610 relates the alignment data from beacon C1 to: event data that was recorded at time 17.6.

Data 500 and 600 stored by recording device C and D respectively provides the information that event data 214 recorded at time 51 by recording device C relates to event data 244 recorded at 17.6 by recording device C. Knowledge that the beacons are wirelessly broadcast by a recording device (e.g., recording device C) for receipt by other recording devices (e.g., recording device D) provides the further information needed to determine that event data 214 at time 51 aligns with event data 244 at time 17.6 except for delay 230. If delay 230 were zero (e.g., no transmission delay, no communication circuit delay, no storage delay), then event data 214 at time 51 would align with event data 244 at time 17.6, so aligned playback (e.g., presentation, replay, display) may be achieved by starting playback of event data 214 at time 51 and event data 244 at time 17.6.

The same concepts of alignment apply to the record data 500 and 600 with respect to alignment data C2 and C3. Further alignment may also be determined for the recorded data 500 and 600 that is related to alignment data D1 and D2. For example:
event data 214 at time 56 aligns with event data 244 at time 22.7 plus delay 232;
event data 214 at time 61 aligns with event data 244 at time 27.9 plus delay 234;
event data 244 at time 19 aligns with event data 214 at time 53.4 plus delay 250; and
event data 244 at time 24 aligns with event data 214 at time 58.8 plus delay 252.

The alignment data that is transmitted and recorded by one recording device and received and recorded by another recording device may be used to related the event data recorded by each device to each other because each device records and relates the alignment data to their respective event data using their respectively maintained time that marks when event data is recorded by the respective devices.

A recording device may use serial number 410 as received in received alignment data 600 to identify the source of received recording status. A recording device may maintain a record of the received serial numbers in conjunction with tracking recording status. A recording device may store the serial number associated with a recording status. A recording device may record the time of receipt of the recording status from another device. When recording status is part of an alignment beacon, recording the time of arrival of the beacon is accomplished as discussed herein. A recording device may maintain a current recording status for itself and other recording devices from which the recording device receives beacons. A recording device may maintain a historical record of its own recording status and the recording status of recording devices from which the recording device has received beacons. A historical record may include the time of a status. When recording status is part of an alignment beacon, a historical record is made by recording received alignment data 600 as discussed herein. A historical record may be used to determine a lapse in receiving beacons from one or more recording devices.

In an implementation in which status identifier 414 includes recording status, the above procedures for receiving and storing received alignment data 600 may be used to receive and store recording status.

Aligned playback of event data recorded by different recorded device may be accomplished by determining when event data from one device aligns with event data of the other devices and playing back the data in such a manner that the aligned times are played approximately at the same time. Alignment need to be exact because humans can tolerate some difference (e.g., up to 90 milliseconds) between hearing speech and movement of a lips of the person speaking or seeing the lips of a human move as recorded by one recording device and hearing the words of the human as recorded by a different recording device.

Alignment as disclosed herein may be accomplished without a device transmitting the time that it maintains or by each device relating to a master time or master clock.

Detecting alignment of recorded event data and playing back recorded event data in an aligned (e.g., synchronized) manner may be accomplished by a server. Alignment may also be accomplished in near-real time when event data is live-streamed for presentation as discussed above.

Methods for accounting for the delay due to transmission, communication circuits, and/or storage of alignment data is discussed in more detail below.

As briefly discussed above, alignment data as stored by many devices may also be used to determine relationships between devices. For example, a server that has access to the recorded event and alignment data from many recording devices (e.g., refer to recorded data store 930 in FIG. 9) may determine which devices were likely at the same incident.

Figure 3:
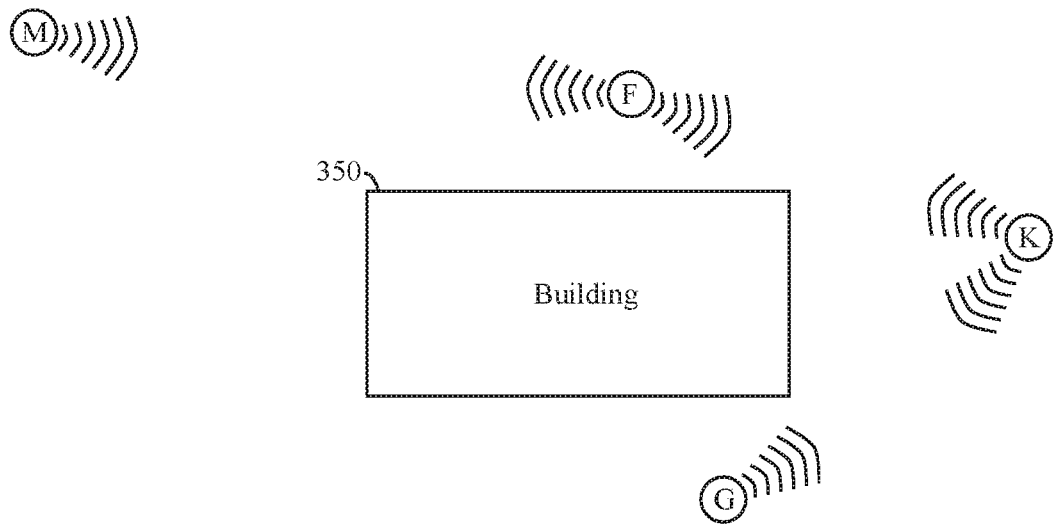
FIG. 3 is a diagram of the transmission and reception of alignment data among multiple recording devices.

Referring to FIG. 3, recording devices M, F, G, and K around location 300 record event data, transmit alignment beacons, and receive alignment beacons. Although not shown for the sake of clarity, recording devices F, G, K, and M transmit and receive radio signals omnidirectionally.

Recording device G transmit alignments beacons G1, G2, G3 (e.g., 310), and so forth. Recording device K transmits alignment beacons K1, K2, K3 (e.g., 320), and so forth. Recording device F transmits alignment beacons F1, F2, F3 (e.g., 330), and so forth. Recording device M transmits alignment beacons M1, M2, M3 (e.g., 340), and so forth.

Recording device G receives alignment beacons from recording device K (e.g., 312). Building 350 blocks alignment beacons between recording devices G, F, and M, so recording device G does not receive alignment beacons from recording devices F and M and recording devices F and M do not receive alignment beacons from recording device G.

Recording device K receives alignment beacons from recording device G (e.g., 322) and recording device F (e.g., 324). Recording device K is out of the range of transmission of recording device M, so recording device K does not receive alignment beacons from recording device M.

Recording device F receives alignment beacons from recording device K (e.g., 332) and recording device M (e.g., 334). Recording device F is positioned with respect to building 350 and recording device G so that recording device F does not receive beacons from recording device G.

Recording device M receives alignment beacons from recording device F (e.g., 342). Recording device M is out of the range of transmission of recording device K, so it does not receive beacons from recording device K. Beacons from recording device G are blocked by building 350, so recording device M does not receive beacons from recording device G. Recording devices F, G, K, and M transmit and record alignment data as discussed above. Recording devices F, G, K, and M receive and record alignment data as discussed above. Each recording device F, G, K, and M maintains their own time. Each recording device F, G, K, and M records the occurrences around them as event data as discussed above. Recording devices F, G, K, and M may transfer their recorded event and alignment data to a server. Recording devices F, G, K, and M may transfer their recorded event and alignment data to a server using any conventional method (e.g., dock, access point) and/or conventional communication protocol whether directly or indirectly.

A server may use the recorded alignment data to determine whether recording devices and their respectively recorded event data are related to each other. Recording devices that record occurrences at the same event are related to each other with respect to that event.

A server may determine that a relationship may exist between recording device G and recording device K because the recorded data, as shown in FIG. 3, shows that recording device G received alignment beacons from recording device K (e.g., 312) and recording device K received alignment beacons from recording device G (e.g., 322).

A server may determine that a relationship may exist between recording device K and recording device F because recording device K received alignment beacons from recording device F (e.g., 324) and recording device F received alignment beacons from recording device K (e.g., 332).

A server may determine that a relationship may exist between recording device F and recording device M because recording device F received alignment beacons from recording device M (e.g., 334) and recording device M received alignment beacons from recording device F (e.g., 342).

A server could determine that some type of relationship may exist between recording device G and recording device F because recording device K received alignment beacons from both recording device G (e.g., 322) and recording device F (e.g., 324). A server may determine that a relationship may exist between recording device K and recording device M because recording device F received alignment beacons from both recording device K (e.g., 332) and recording device M (e.g., 334).

A server could determine the number of alignment beacons received from any one recording device to determine whether the recording device is related directly or indirectly to another recording device. For example, if a recording device receives few alignment beacons from one recording device as compared to other recording devices during the same time frame, it is possible that the one recording device was merely passing by the location where the other recording devices were located. The server could align the recorded data from the passing recording device to playback with the recorded event data from the other recording devices so a human or machine analyst could determine whether the recorded event data from the passing recording device is relevant to event recorded by the other recording devices.

A server could access other information to facilitate determining whether a relationship exists between two or more recording devices. Other information may include signal strength 612 and agency data (e.g., dispatch, personnel) as discussed above.

Signal strength 612 is the strength (e.g., signal strength indicator) of the wireless signal of a received alignment beacon as measured by the receiving device. A server could access signal strength 612 for beacons G1, G2, G3, and so forth as received by recording device K to determine that recording device K and recording device G are likely physically proximate because the signal strengths of the alignment beacons are relatively strong. The server may also access signal strength 612 for beacons F1, F2, and F3 as received by recording device K to determine that recording device K and recording device F also are likely physically proximate because the signal strengths of the alignment beacons are relatively strong. The server may then determine that recording device G and recording device F are likely related because they are physically proximity to recording device K based on the receive signal strengths between recording devices K and G and recording devices K and F.

The server could also access signal strength 612 for beacons M1, M2, and M3 as received by recording device F to determine that the signal strength of the signals from recording device M are weak (e.g., small, low) thereby indicating that recording device M is likely physically far from recording device F or some type of barrier is positioned between recording device F and recording device M that may limit their ability to collect event data for the same event. In this case, a weak signal strength 612 may lead the server to conclude that recording device F and recording device M may not be recording the same event and are therefore not related at least by the event.

A server could use information from the security agency to which the people carrying recording devices F, G, K, and M belong to also assess whether recording devices and their respective recorded event data are related. For example, as discussed above, a security agency may have a system (e.g., server, computer) used by dispatch personnel to one or more incidents. The dispatch system may record the time and identity of the officers that were dispatched to a particular incident. A security agency may further include other systems that store information that relates a recording device, a badge number, a vehicle number, or other object to a particular officer either permanently or for a particular time. For example, one or more recording devices (e.g., CEW, holster, body-camera, vehicle) may be assigned to an officer to use.

A server that receives the recorded event and alignment data from the various recording devices may also receive the information from the computers of the security agency. The server may use to agency data to determine that the officers carrying recording devices F, G, and K were dispatched to the same incident, so even though recording device F did not receive any alignment data from recording device G, they are related because they were dispatched to the same event. The agency data confirms the likely association between recording device F and recording device G through recording device K and as further borne out by the strong signal strength 612 of beacons G1, G2, and G3 and beacons F1, F2, and F3 as received by recording device K.

The server may also use the agency data to determine that recording device M was dispatch to an event that was different from the event to which recording devices F, G, and K were dispatched. The agency data is consistent with the weak signal strength 612 of beacons M1, M2, M3, and so forth as received by recording device F.

A server may use alignment data and/or agency data to determine which recording devices likely recorded event data of the same event so that the server may use the alignment data to align the recorded event data from related recording devices for playback of a particular event.

Figure 9:
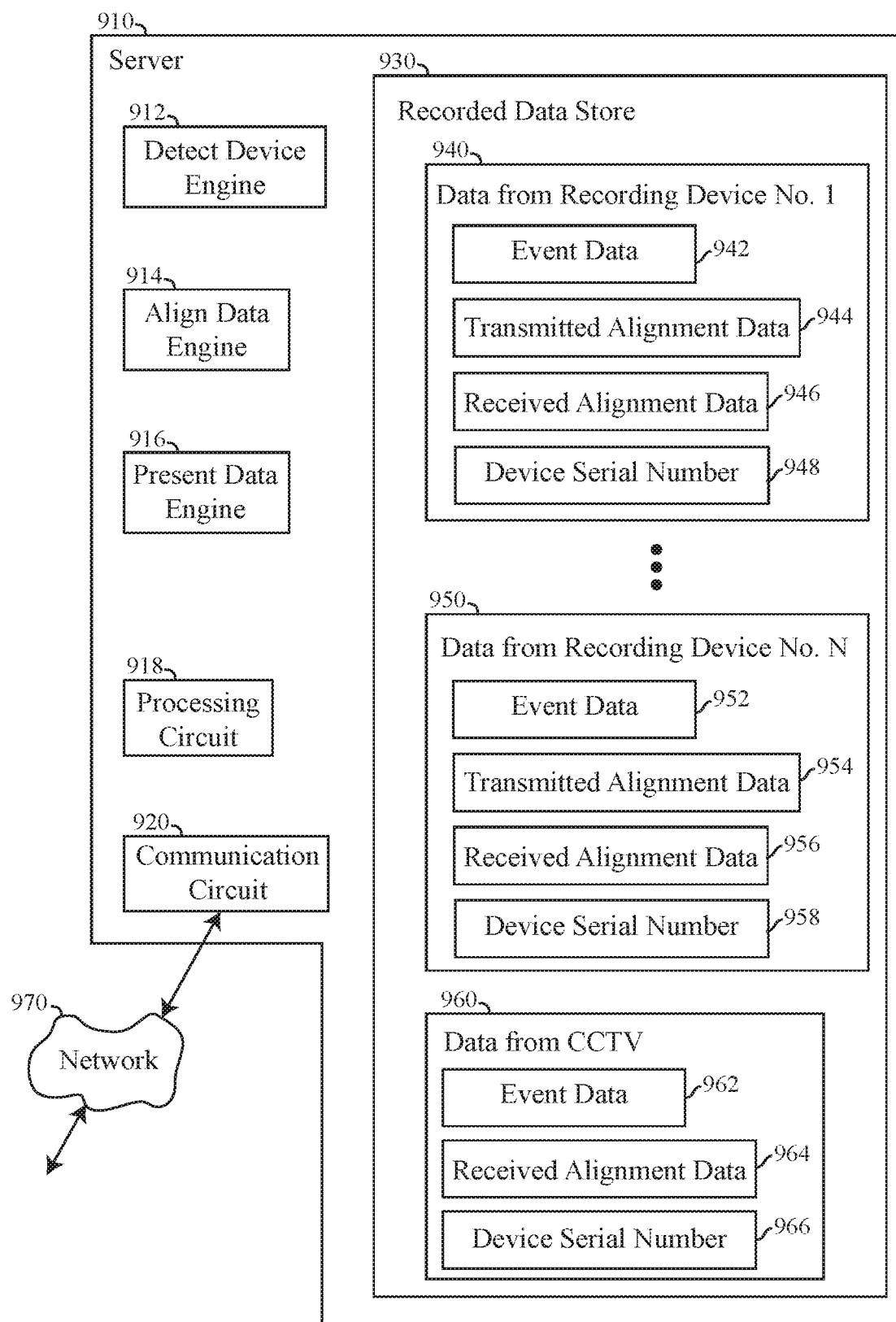
FIG. 9 is a block diagram of server that receives event and alignment data from one or more recording devices and performs operations related to the event and alignment data according to various aspects of the present disclosure.

A server is not limited to receiving the event and alignment data from recording devices of the same agency. Server 910 in FIG. 9 shows recorded data store 930 that stores event and alignment data from many (e.g., N) recording devices. The recording devices may be owned and/or controlled by the same agency or groups of recording devices may be owned and/or controlled by different agencies. In another implementation, server 910 may include many recorded data stores 930 that each store the event and alignment data for a single agency.

Assuming that agencies do not readily share their event and alignment data, server 910 processes (e.g., searching, sorting, mining, aligning, playing back) event and alignment data only from recording devices of the same agency. However, it is conceivable that personnel from different agencies (e.g., city police, city fire, city building inspectors, FBI, DEA, national guard) were present at the same event. It is also conceivable that a recording device from one agency captured and stored event data that was not captured and stored by any of the other agencies. Because such a situation could exist, a server could search the event and alignment data from many agencies and report to one agency when the recording devices of a different agency may have recorded event data that is relevant to the one agency.

For example, returning to FIG. 3, assume that recording device M is owned or controlled by a first agency, recording device G is owned or controlled by a second agency, and recording devices F and K are owned or controlled by a third agency. The beacons transmitted and received between recording device M and recording device F would alert the server that the first agency might want to request access to the event and alignment data recorded by recording device F from the third agency, and vice versa. Further, the beacons transmitted and received between recording device G and recording device K would alert the server that the second agency might want to request access to the event and alignment data recorded by recording device F from the third agency, and vice versa.

A server could also search across the event and alignment data of many agency for a particular pseudorandom number used as a status identifier 414 to identify event and alignment data that may be useful to different agencies.

A server could also analyze event and alignment data for single agencies then compare the result of the analysis from one agency to the result of analysis for one or more other agencies. For example, a server could analyze event and alignment data to determine the number of events in which a weapon (e.g., firearm) was drawn from a holster, or a CEW was armed, or a shotgun was withdrawn from a vehicle holder, to compare the possible use of force of one agency to the use of force of another agency.

A recording device is not limited to providing alignment data via wireless (e.g., radio) signals. A recording device may transmit alignment data (e.g., data 400) as optical (e.g., light) signals and/or audio (e.g., sound) signals. Optical and/or audio transmissions may be in addition to or exclusive of radio transmissions.

Figure 7:
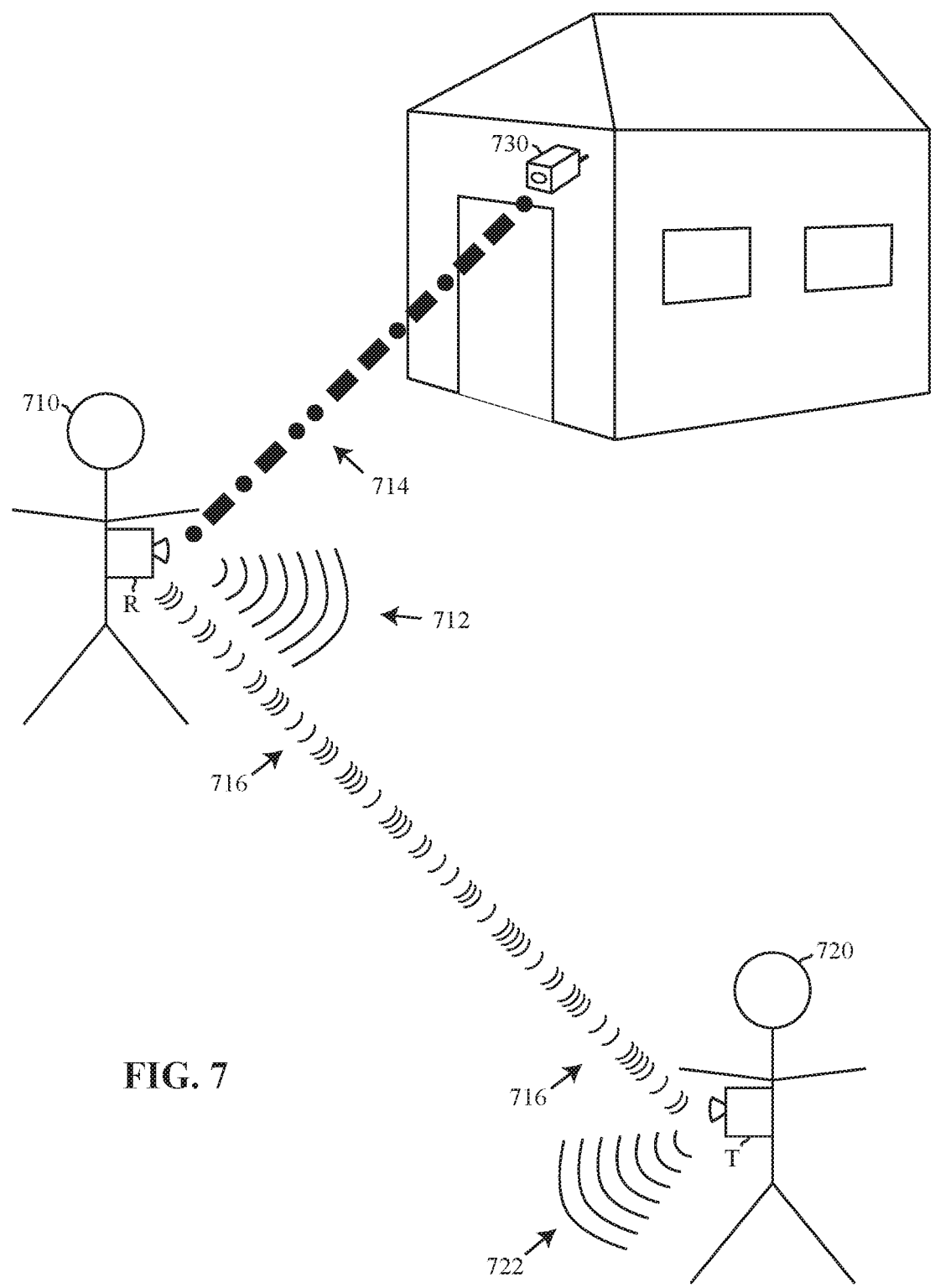
FIG. 7 is a diagram of a recording device at a location of an event transmitting the alignment data of FIG. 4 via light and sound according to various aspects of the present disclosure.

For example, recording device R, of FIG. 7, transmits the alignment data optically (e.g., 714), audibly (e.g., 716), and by wireless radio transmission (e.g., 712). Assuming that recording device T is a video recorder, recording device T may receive and record alignment data via all three types of signals. Optical alignment data is particularly suitable for reception by CCTV camera 730 because CCTV cameras generally do not capture audio information or receive wireless transmissions. Optical transmissions may be in the range of light that is visible to humans or in another range of light that is not visible to humans.

The visual alignment data captured by CCTV camera 730 likely will not be stored as data, but as part of the image that is stored as event data. The visual alignment data may need to be detected in the event data and transcribed into data that can be stored in a file and searched by a server. Extracting the visual alignment data from the event data recorded by CCTV camera 730 permits the visual alignment data to be uploaded to a server and use much like the alignment data discussed above. Transcribed visual alignment data may be used by the server to find relationships between CCTV camera 730 and other recording devices and to appropriately align the data from CCTV camera 730 to the event data from other recording devices (e.g., R, T) for playback.

Recording device T may receive audible alignment data because it is capable of capturing and recording audible information. The audio signals may include the alignment data encoded in some manner (e.g., Morse code) for audible detection and recording. The audible transmission may be in the range of human hearing or above the range of human hearing. The audible alignment data received by recording device T may be transcribed into a data file for use by the server that receives the recorded event and alignment data from recording devices as discussed above.

As discussed above, delays associated with generating alignment data, storing alignment data, transmitting alignment beacons, receiving alignment beacons, and extracting alignment data from an alignment beacon affects the alignment of recorded event data from different recording devices. Delays between a transmitting device and a receiving device may include the time to store the alignment data (e.g., 500) in the memory of the transmitting device, time for formatting the beacon with the alignment data (e.g., 400) for transmission, time for transmission of the beacon from the transmitting device to the receiving device, time for receiving the alignment beacon, time for extracting the alignment data from the alignment beacon, and/or time for storing the received alignment data (e.g., 600) in the memory of the receiving device.

All of the delays need not be part of the delay between two devices. A transmitting device that stores the alignment data 500 in its memory before providing the alignment data for transmission records stores time 510 so that the delay of transmission includes possibly the time to store the data and the time for formatting the beacon with the alignment data for transmission. A transmitting device that stores the alignment data 500 in its memory after transmission is completed stores time 510 so that the delay does not include the delay of formatting the alignment beacon.

A receiving device that records time 610 upon receipt of an alignment beacon omits from the delay the time to process the beacon and store the alignment data.

The various components of delay may vary from time to time. For example, a processing circuit may provide the alignment data to a communication circuit to form and transmit the alignment beacon, but there may be delays in when the communication circuit starts the task of forming and aligning. The transmission of radio waves may vary from one alignment beacon to another.

The time that a receiving device determines that it has received an alignment beacon and when it records time 610 may vary depending on the scheduling of tasks by a communication circuit and a processing circuit.

Figure 10:
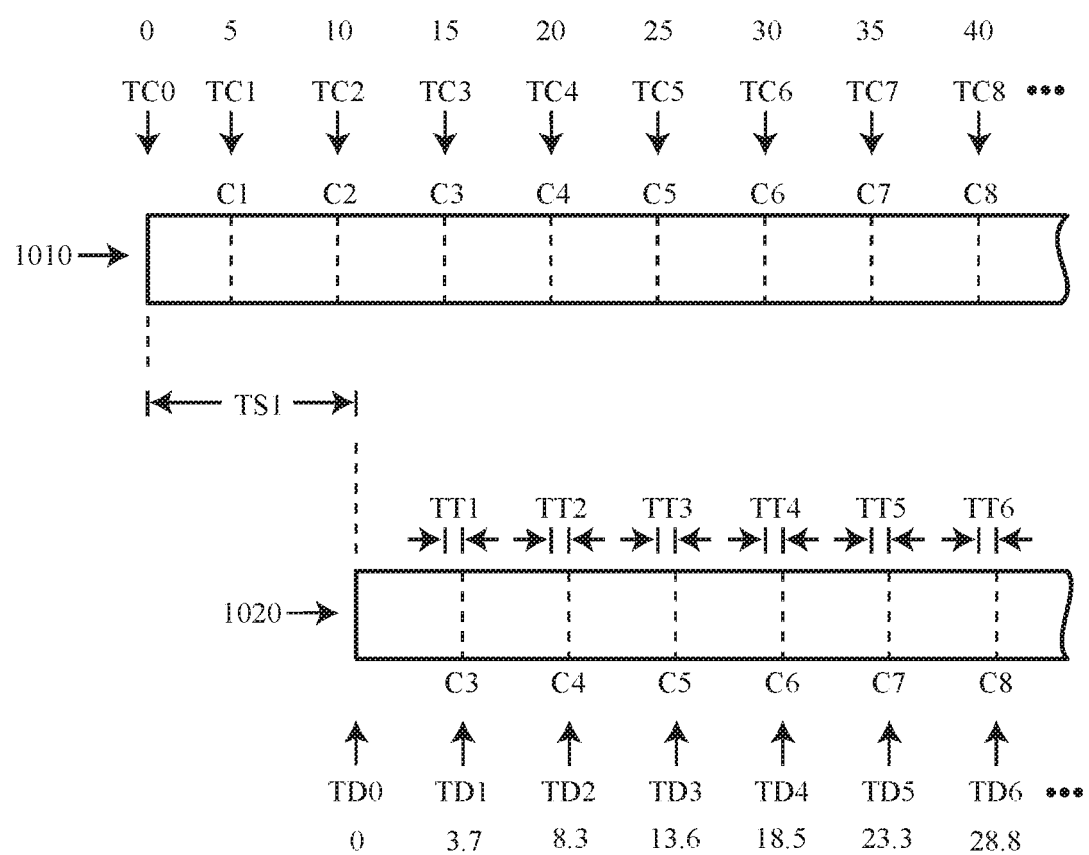
FIG. 10 is a diagram of aligning recorded data from two recording devices using alignment information transmitted by one device and received by the other.

Referring to FIG. 10, a recording device (e.g., recording device C) records event data 1010 and records and transmits alignment data C1, C2, and so forth. Recording device C maintains its own time TC0, TC1, and so forth. Recording device C records alignment data C1, C2, and so forth at time TC1, TC2, and so forth respectively and either at the same time or shortly thereafter transmits the alignment data. For the sake of discussion only, times TC0, TC1, and so forth are shown to be time 0, 5, and so forth. The units on the times 0, 5, and so forth may be any unit; however, in the examples below, the units are milliseconds. The times for TC0, TC1, and so forth are whole numbers and at regular intervals to emphasis the delay as made evident in the values for times TD0, TD1, and so forth.

Another recording device (e.g., recording device D) records event data 1020 and receives and records alignment data C1, C2, and so forth. Recording device D maintains its own time TD0, TD1, and so forth. Recording device D records the receipt of alignment data C3, C4, and so forth at time TD1, TD2, and so forth respectively. Alignment beacons C3, C4 and so forth arrive from recording device C to recording device D after delay TT1, TT2, and so forth respectively. The delay (e.g., TT1, TT2, so forth) may be due to the factors that result in delay and jitter as discussed above. For the sake of discussion only, times TD0, TD1, TD2, and so forth are shown to be time 0, 3.7, 8.3, and so forth. The times may have any unit, but in the examples below, the units are milliseconds.

As discussed above, time TC3 is related to time TD1 by alignment data C3 as recorded in data 500 by recording device C and data 600 as recorded by recording device D, time TC4 is related to time TD2 by alignment data C4, and so forth. Event data 1010 may be aligned and played back for viewing by presenting event data 1010 at time TC3 as close as possible in time to event data 1020 at time TD1. The same applies to closely presenting event data 1010 and 1020 at time TC4 and TD2, time TC5 and TD3, and so forth.

For example, the delay between TC3 and TC4 (e.g., TC4−TC3) is 5 milliseconds. The delay between all times TCX is 5 milliseconds. However, the delay between the times TD1, TD2, and so forth vary. The delay between TD2 and TD1 is 4.6 milliseconds, the delay between TD3 and TD2 is 5.3 milliseconds, the subsequent delays are 4.9, 4.8, and 5.5 milliseconds. The delays between the receipt of the alignment data at recording device D vary due to jitter as discussed above.

If the delay and/or variations in delay are small enough, for example less than 90 milliseconds, event data 1010 may be aligned to event data 1020 for playback merely by starting playback of event data 1020 at an appropriate time with respect to playback of event data 1010.

In this example, recording device C begins recording event data 1010 before recording device D begins recording event data 1020. Alignment of event data 1010 to event data 1020 for payback may be accomplished by determining an appropriate time for TS1. If the playback of event data 1020 is started time TS1 after the playback of event data 1010 begins, the playback of the different recordings should be aligned.

From the diagram in FIG. 10, it is clear that:

| | |
|---|---|
| TS1=TC3−TD1=11.3; or | Equation no. 1: |
| TS1=TC4−TD2=11.7; or | Equation no. 2: |
| TS1=TC5−TD3=11.4; or | Equation no. 3: |
| TS1=TC6−TD4=11.5; or | Equation no. 4: |
| TS1=TC7−TD5=11.7; or | Equation no. 5: |
| TS1=TC8−TD6=11.2; and so forth. | Equation no. 6: |

As shown above, the values for TS1 for equation nos. 1-6 using the example times in FIG. 10 are:

11.3, 11.7, 11.4, 11.5, 11.7, and 11.2.

The above values mean that recording device D started recording event data 1020 sometime between 11.2 milliseconds and 11.7 milliseconds after recording device C started recording event data 1010. The differences in the times are due to the jitter in the delay of preparing and transmitting alignment beacons C1, C2 and so forth.

There are various methods for determining which value of TS1 should be used to align event data 1010 and event data 1020 during payback. One method is to set TS1 equal to the average of the values from equation nos. 1-6. In this example, the average value of TS1 for equation nos. 1-6 is 11.47 milliseconds. Using the average value, the playback of event data 1020 should begin 11.47 milliseconds after the start of playback of event data 1010 to provide aligned playback.

Another method is to selected the minimum value of TS1 from equation nos. 1-6. The smallest value of TS1 for equation nos. 1-6 may represent the amount of delay that cannot be avoided between recording device C and recording device D. The smallest value of delay may represent the time when the minimum possible delays introduced by the operation of recording device C while preparing and transmitting the alignment beacon and minimum possible delays introduced by the operation of recording device D while receiving and processing the alignment beacon. The minimum delay may represent the time of transit via radio signal between the devices with little other delay. The minimum value in this example is 11.2 milliseconds, so under this approach the playback of event data 1020 would begin 11.2 milliseconds after the start of playback of event data 1010.

The question arises whether merely delaying the start of playback of event data 1020 by TS1 is sufficient to align the event data for playback that is acceptable to humans as discussed above. In this example, the delay between receipt of alignment data C4 and C3 (e.g., TD2–TD1), and C5 and C4 (e.g., TD3–TD2), and so forth is 4.6, 5.3, 4.9, 4.8, and 5.5 milliseconds respectively as discussed above. Because the difference between the largest and the smallest delay is only 0.9 milliseconds, alignment by starting playback of event data 1010 and event data 1020 at the appropriate times will likely provide sufficient alignment for human viewing because the jitter in the alignment (e.g., 0.9 milliseconds) is less than the threshold of about 90 milliseconds that humans can notice.

Figure 8:
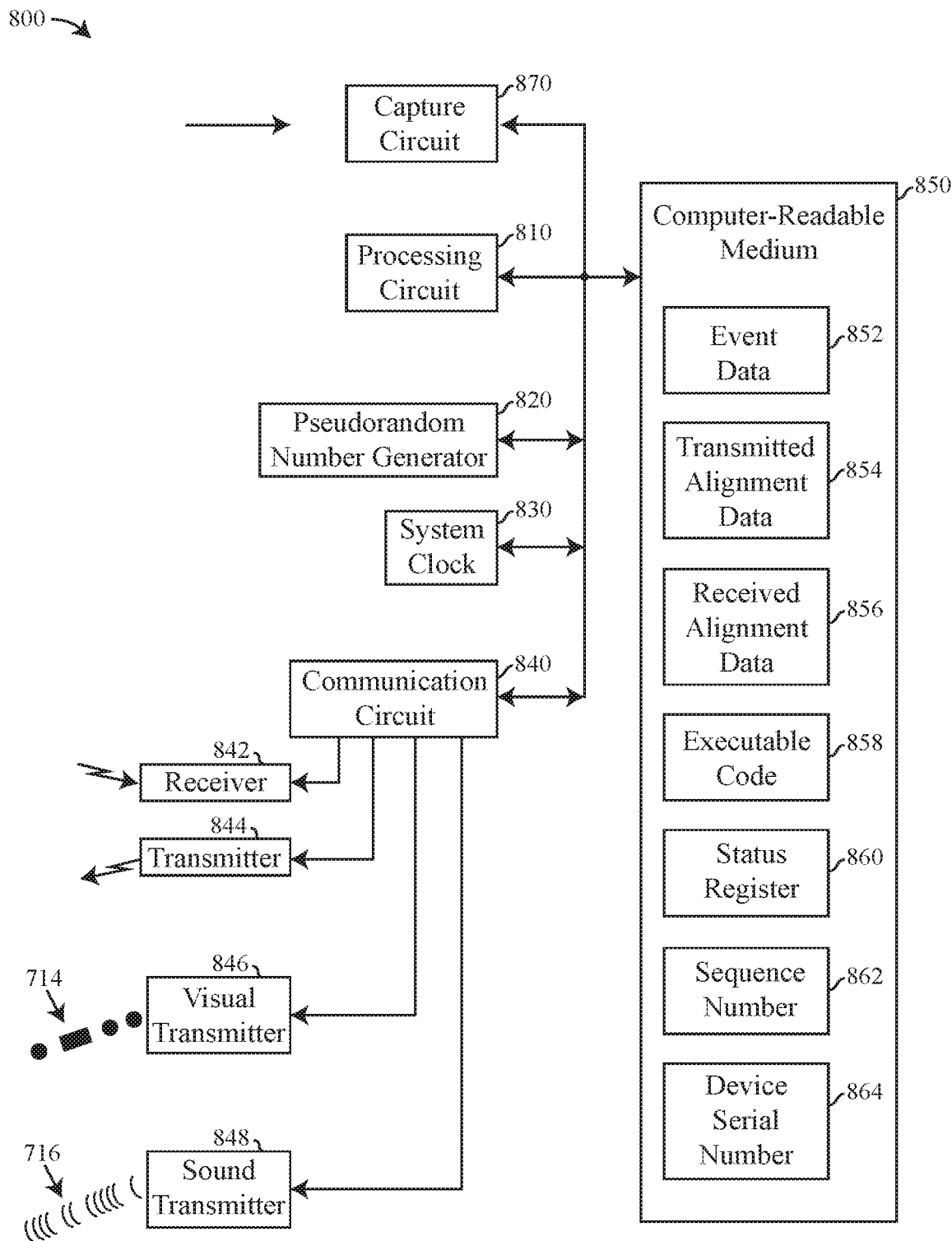
FIG. 8 is a block diagram of an implementation of a recording device according to various aspects of the present disclosure.

Recording device 800 of FIG. 8 is an implementation of a recording device. Recording device 800 may perform the functions of a recording device discussed above. Recording device 800 includes processing circuit 810, pseudorandom number generator 820, system clock 830, communication circuit 840, receiver 842, transmitter 844, visual transmitter 846, sound transmitter 848, and computer-readable medium 850. Computer-readable medium 850 may store data such as event data 852, transmitted alignment data 854, received alignment data 856, executable code 858, status register 860, sequence number 862, and device serial number 864.

Event data 852 may include event data 214, 244, 1010, and/or 1020 discussed above.

Transmitted alignment data may include alignment data 500 as discussed with respect to alignment data or beacons C1, C2 . . . , D1, D2 . . . , F1, F2 . . . , and so forth.

Received alignment data 856 may include alignment data 600 as discussed with respect to alignment data or beacons C1, C2 . . . , D1, D2 . . . , F1, F2 . . . , and so forth.

Status register 860 may store the status information for recording device 800 as discussed above.

The value of sequence number 862 may be determined by processing circuit 810 and/or a counter. If the value of sequence number 862 is determined by a counter, processing circuit 810 may control the counter in whole or in part to increment the value of the sequence number at the appropriate time. The present value of sequence number 862 is stored as sequence number 412 upon generation of respective alignment data 400, and as stored as sequence number 412 in data 500 and data 600 of the various stored alignment data.

Device serial number 864 corresponds to serial number 410. Preferably, device serial number 864 cannot be altered.

Visual transmitter 846 and/or sound transmitter may be omitted from recording device 800 at the cost of precluding the receipt of alignment data by certain types of devices such as CCTV cameras.

A processor circuit includes any circuitry and/or electrical/electronic subsystem for performing a function. A processor circuit may include circuitry that performs (e.g., executes) a stored program (e.g., executable code 858). A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic, gyroscopes). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus. A bus may operate as a serial bus and/or a parallel bus.

Processing circuit 810 may perform all or some of the functions of pseudorandom number generator 820. In the event that processing circuit 810 performs all of the functions of pseudorandom number generator 820, the block identified as pseudorandom number generator 820 may be omitted due to incorporation into processing circuit 810.

Processing circuit 810 may perform all or some of the functions of system clock 830. System clock 830 may include a real-time clock. In the event that processing circuit 810 performs all of the functions of system clock 830, the block identified as system clock 830 may be omitted due to incorporation into processing circuit 810. Clock 830 may be a crystal that provides a signal to processing circuit 810 for maintaining time.

Processing circuit 810 may track the state of operation, as discussed above, and update status register 860 as needed. Processing circuit 810 may cooperate with pseudorandom number generator 820 to generate a pseudorandom number for use as a status identifier such as status identifier 414 as discussed above.

Processing circuit 810 may perform all or some of the functions of communication circuit 840. Processing circuit 810 may form alignment data (e.g., 400) for transmission and/or alignment data 500 or 600 storage. Processing circuit 810 may cooperate with communication circuit 840 to form alignment beacons to transmit alignment data. Processing circuit 810 may cooperate with communication circuit 840 to receive alignment beacons, extract, and store received alignment data (e.g., 600).

Processing circuit 810 may cooperate with computer-readable medium 850 to read, write, format, and modify data stored by computer-readable medium 850.

A communication circuit may transmit and/or receive information (e.g., data). A communication circuit may transmit and/or receive (e.g., communicate) information via a wireless link and/or a wired link. A communication circuit may communicate using wireless (e.g., radio, light, sound, vibrations) and/or wired (e.g., electrical, optical) mediums.

A communication circuit may communicate using any wireless (e.g., Bluetooth, Zigbee, WAP, WiFi, NFC, IrDA, GSM, GPRS, 3G, 4G) and/or wired (e.g., USB, RS-232, Firewire, Ethernet) communication protocols. Short-range wireless communication (e.g. Bluetooth, Zigbee, NFC, IrDA) may have a limited transmission range of approximately 20 cm-100 m. Long-range wireless communication (e.g. GSM, GPRS, 3G, 4G, LTE) may have a transmission ranges up to 15 km. A communication circuit may receive information from a processing circuit for transmission. A communication circuit may provide received information to a processing circuit.

A communication circuit may arrange data for transmission. A communication circuit may create a packet of information in accordance with any conventional communication protocol for transmit. A communication circuit may disassemble (e.g., unpack) a packet of information in accordance with any conventional communication protocol after receipt of the packet.

A communication circuit may include a transmitter (e.g., 844, 846, 848) and a receiver (e.g., 842). A communication circuit may further include a decoder and/or an encoder for encoding and decoding information in accordance with a communication protocol. A communication circuit may further include a processing circuit for coordinating the operation of the transmitter and/or receiver or for performing the functions of encoding and/or decoding.

A communication circuit may provide data that has been prepared for transmission to a transmitter for transmission in accordance with any conventional communication protocol. A communication circuit may receive data from a receiver. A receiver may receive data in accordance with any conventional communication protocol.

A visual transmitter transmits data via an optical medium. A visual transmitter uses light to transmit data. The data may be encoded for transmission using light. Visual transmitter 846 may include any type of light source to transmit light 714. A light source may include an LED. A communication circuit and/or a processing circuit may control in whole or part the operations of a visual transmitter.

Visual transmitter 846 performs the functions of a visual transmitter as discussed above.

A sound transmitter transmits data via a medium that carries sound waves. A sound transmitter uses sound to transmit data. The data may be encoded for transmission using sound. Sound transmitter 848 may include any type of sound generator to transmit sound 716. A sound generator may include any type of speaker. Sound may be in a range that is audible to humans or outside of the range that is audible to humans. A communication circuit and/or a processing circuit may control in whole or part the operations of a sound transmitter.

Sound transmitter 848 performs the functions of a sound transmitter as discussed above.

A capture circuit captures data related to an event. A capture circuit detects (e.g., measures, witnesses, discovers, determines) a physical property. A physical property may include momentum, capacitance, electric charge, electric impedance, electric potential, frequency, luminance, luminescence, magnetic field, magnetic flux, mass, pressure, spin, stiffness, temperature, tension, velocity, momentum, sound, and heat. A capture circuit may detect a quantity, a magnitude, and/or a change in a physical property. A capture circuit may detect a physical property and/or a change in a physical property directly and/or indirectly. A capture circuit may detect a physical property and/or a change in a physical property of an object. A capture circuit may detect a physical quantity (e.g., extensive, intensive). A capture circuit may detect a change in a physical quantity directly and/or indirectly. A capture circuit may detect one or more physical properties and/or physical quantities at the same time (e.g., in parallel), at least partially at the same time, or serially. A capture circuit may deduce (e.g., infer, determine, calculate) information related to a physical property. A physical quantity may include an amount of time, an elapse of time, a presence of light, an absence of light, a sound, an electric current, an amount of electrical charge, a current density, an amount of capacitance, an amount of resistance, and a flux density.

A capture circuit may transform a detected physical property to another physical property. A capture circuit may transform (e.g., mathematical transformation) a detected physical quantity. A capture circuit may relate a detected physical property and/or physical quantity to another physical property and/or physical quantity. A capture circuit may detect one physical property and/or physical quantity and deduce another physical property and/or physical quantity.

A capture circuit may include and/or cooperate with a processing circuit for detecting, transforming, relating, and deducing physical properties and/or physical quantities. A processing circuit may include any conventional circuit for detecting, transforming, relating, and deducing physical properties and/or physical quantities. For example, a processing circuit may include a voltage sensor, a current sensor, a charge sensor, and/or an electromagnetic signal sensor. A processing circuit may include a processor and/or a signal processor for calculating, relating, and/or deducing.

A capture circuit may provide information (e.g., data). A capture circuit may provide information regarding a physical property and/or a change in a physical property. A capture circuit may provide information regarding a physical quantity and/or a change in a physical quantity. A capture circuit may provide information in a form that may be used by a processing circuit. A capture circuit may provide information regarding physical properties and/or quantities as digital data.

Data provided by a capture circuit may be stored in in computer-readable medium 850 thereby performing the functions of a recording device, so that capture circuit 870 and computer-readable medium 850 cooperate to perform the functions of a recording device.

Capture circuit 870 may perform the functions of a capture circuit discussed above.

A pseudorandom number generator generates a sequence of numbers whose properties approximate the properties of a sequence of random numbers. A pseudorandom number generator may be implemented as an algorithm executed by a processing circuit to generate the sequence of numbers. A pseudorandom number generator may include any circuit or structure for producing a series of numbers whose properties approximate the properties of a sequence of random numbers.

An algorithm for producing the sequence of pseudorandom numbers includes a linear congruential generator algorithm and a deterministic random bit generator algorithm.

A pseudorandom number generator may produce a series of digits in any base that may be used for a pseudorandom number of any length (e.g., 64-bit).

Pseudorandom number generator 820 may perform the functions of a pseudorandom number generator discussed above.

A system clock provides a signal from which a time or a lapse of time may be measured. A system clock may provide a waveform for measuring time. A system clock may enable a processing circuit to detect, track, measure, and/or mark time. A system clock may provide information for maintaining a count of time or for a processing circuit to maintain a count of time.

A processing circuit may use the signal from a system clock to track time such as the recording of event data. A processing circuit may cooperate with a system clock to track and record time related to alignment data, the transmission of alignment data, the reception of alignment data, and the storage of alignment data (e.g., 510, 610).

A processing circuit may cooperate with a system clock to maintain a current time (e.g., day, date, time of day) and detect a lapse of time. A processing circuit may cooperate with a system clock to measure the time of duration of an event.

A system clock may work independently of any system clock and/or processing device of any other recording device. A system clock of one recording device may lose or gain time with respect to the current time maintained by another recording device, so that the present time maintained by one device does not match the present time as maintained by another recording device. A system clock may include a real-time clock.

System clock 830 may perform the functions of a system clock discussed above.

A computer-readable medium may store, retrieve, and/or organize data. As used herein, the term "computer-readable medium" includes any storage medium that is readable and/or writeable by an electronic machine (e.g., computer, computing device, processor, processing circuit, transceiver). Storage medium includes any devices, materials, and/or structures used to place, keep, and retrieve data (e.g., information). A storage medium may be volatile or non-volatile. A storage medium may include any semiconductor medium (e.g., RAM, ROM, EPROM, Flash), magnetic medium (e.g., hard disk drive), medium optical technology (e.g., CD, DVD), or combination thereof. Computer-readable medium includes storage medium that is removable or non-removable from a system. Computer-readable medium may store any type of information, organized in any manner, and usable for any purpose such as computer readable instructions, data structures, program modules, or other data. A data store may be implemented using any conventional memory, such as ROM, RAM, Flash, or EPROM. A data store may be implemented using a hard drive.

Computer-readable medium may store data and/or program modules that are immediately accessible to and/or are currently being operated on by a processing circuit.

Computer-readable medium 850 stores event data as discussed above. Event data 852 represents the event data stored by computer-readable medium 850. Computer-readable medium 850 stores transmitted alignment data (e.g., 500). Transmitted alignment data 854 represents the transmitted alignment data stored by computer-readable medium 850. Computer-readable medium 850 stores received alignment data (e.g., 600). Received alignment data 856 represents the received alignment data stored by computer-readable medium 850.

Computer-readable medium 850 stores executable code 858. Executable code may be read and executed by any processing circuit of recording device 800 to perform a function. Processing circuit 801 may perform one or more functions of recording device 800 by execution of executable code 858. Executable code 858 may be updated from time to time.

Computer-readable medium 850 stores a value that represents the state of operation (e.g., status) of recording device 800 as discussed above.

Computer-readable medium 850 stores a value that represents the sequence number of recording device 800 as discussed above.

Computer-readable medium 850 stores a value that represents the serial number of recording device 800 as discussed above.

A communication circuit may cooperate with computer-readable medium 850 and processing circuit 810 to store data in computer-readable medium 850. A communication circuit may cooperate with computer-readable medium 850 and processing circuit 810 to retrieve data from computer-readable medium 850. Data retrieved from computer-readable medium 850 may be used for any purpose. Data retrieved from computer-readable medium 850 may be transmitted by communication circuit to another device, such as another recording device and/or a server.

Computer-readable medium 850 may perform the functions of a computer-readable medium discussed above.

Figure 11:
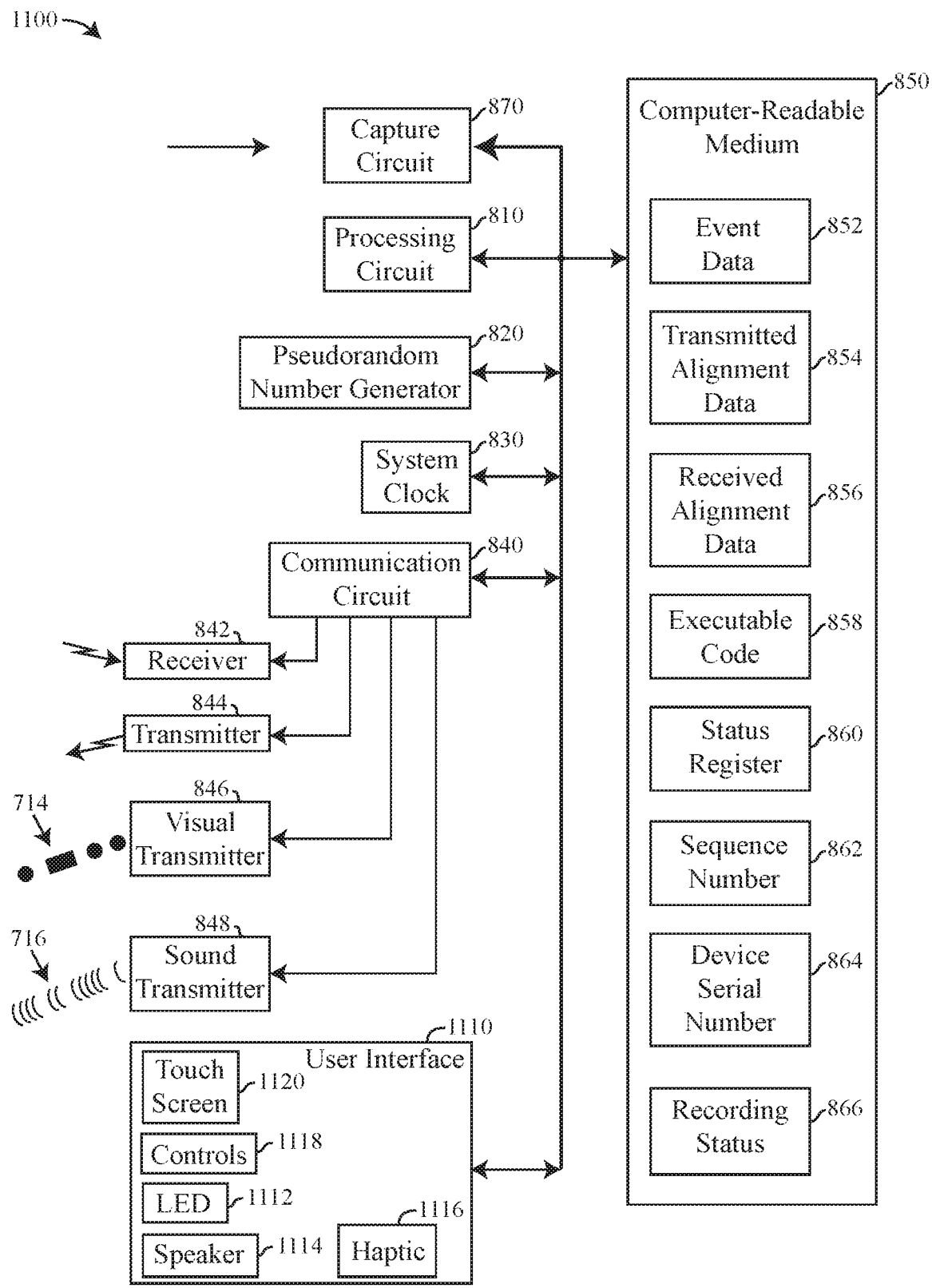
FIG. 11 is a block diagram of another implementation of a recording device according to various aspects of the present disclosure.

Recording device 1100 of FIG. 11 is another implementation of a recording device. Recording device 1100 includes user interface 1110. User interface 1110 may include LED 1112, speaker 1114, haptic 1116, controls 1118, and touch screen 1120.

A user interface provides an interface between a user and a recording device. A user interface enables communication between a user and a recording device. A user interface enables a human user to interact with a recording device. A user may control, at least in part, the operation (e.g., record, buffer, stop recording, turn off, turn on) of a recording device via the user interface. A user may provide information and/or commands to a recording device via a user interface. A user may receive information and/or responses from a recording device via the user interface.

A user interface may include one or more controls that permit a user to interact and/or communicate with a device to control (e.g., influence) the operation (e.g., functions) of the device. A control includes any electromechanical device suitable for manual manipulation by a user. A control includes any electromechanical device for operation by a user to establish or break an electrical circuit. A control may include a portion of a touch screen. A control may include a switch. A switch includes a pushbutton switch, a rocker switch, a key switch, a detect switch, a rotary switch, a slide switch, a snap action switch, a tactile switch, a thumbwheel switch, a push wheel switch, a toggle switch, and a key lock switch (e.g., switch lock). Operation of a control may occur by the selection of a portion of a touch screen.

Operation of a control provides information to a device (e.g., recording device). Operation of a control may result in performance of a function, halting performance of a function, resuming performance of a function, or suspending performance of a function of the device of which the control is a part.

A processing circuit may detect the operation of a control. A processing circuit may perform a function of the device responsive to operation of a control. A processor may perform a function, halt a function, resume a function, or suspend a function of the device of which the control and the processor are a part. A control may provide analog or binary information to a processor. The function performed by a device responsive to operation of a control may depend on the current operating state (e.g., present state of operation, present function being performed) of the device of which the control is a part. For example, if a device is presently performing function 1, operating a control may result in the device performing function 2. If the device is presently performing function 2, operating the control again may result in the device performing function 3.

A part of a control may be illuminated. An illuminate control may receive information from a user by manual operation of the control and provide information by illuminating or not illuminating the control.

A user interface may provide information to a user. A user may receive visual, haptic (e.g., tactile, kinesthetic), and/or audible information from a recording device via a user interface. A user may receive visual information via devices (e.g., components) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed (e.g., a control that provides haptic information). A user interface may include a communication circuit for transmitting information to an electronic device (e.g., smart phone, tablet, portable computer) for presentation to a user. For example, a user interface may wirelessly transmit information to a smart phone for presentation to a user.

A user interface may include voice-to-text or voice-to-instructions converters so that a user may interact with the user interface verbally (e.g., by voice).

For example, a user of recording device 1100 may use user interface 1110 to control, at least in part, the operation of recording device 1100. User interface 1110 may receive information (e.g., commands, data) from a user via controls 1118, touch screen 1120, and/or haptic 1116 (e.g., by shaking recording device 1100).

User interface 1110 may provide information from a user to processing circuit 810 to control, at least in part, the operation of recording device 1100. User interface 1110 may provide information from a user to computer-readable memory 850 for storage. Information from user interface 1110 that is stored may be stored with a time provided by system clock 830. User interface 1110 may provide information from a user to communication circuit 840 for transmission.

User interface 1110 may provide information to a user. For example, processing circuit may provide information to user interface 1110 for presentation directly to a user. Information presented to a user may include received information (e.g., via communication circuit 840), stored information (e.g., from computer-readable medium 850), captured information (e.g., via capture circuit 870) and/or any information that may be accessed, controlled, determined, and/or calculated by processing circuit 810. Information presented to a user may include recording status information. As discussed above, recording status may include the recording status of recording device 1100 and/or the recording status of any recording device from which recording device 1100 receives a beacon.

Recording status information may be presented to a user via LED 1112, speaker 1114, haptic 1116, touch screen 1120, or any combination thereof. LED 1112 may be turned on and off at any rate, illuminate for any duration of time, or provide light at of any color to provide information. For example, while recording device 1100 or any other recording device that provides recording device 1100 beacons is recording, LED 1112 may be illuminated and provide a red light. While recording device 1100 or any other recording device that provides recording device 1100 beacons is not recording, but is buffering captured data, LED 1112 may be illuminated and provide a yellow (e.g., amber) light. While recording device 1100 and all other recording devices that provides recording device 1100 beacons are not recording and not buffering, LED 1112 may be illuminated and provide a green light.

In another example, while recording device 1100 is recording, LED 1112 may be illuminated and provide a red light. While recording device 1100 is buffering, but any other recording device that provides recording device 1100 beacons is recording, LED 1112 may be illuminated and provide a yellow light. While recording device 1100 and all other recording devices are buffering, LED 1112 may be illuminated and provide a green light.

Speaker 1114 may provide sound at any frequency, rhythm, duration, or intensity to provide information. Speaker 1114 may provide a first sound while recording device 1100 is recording, a second sound while recording device 1100 is buffering, but any other recording device that provides recording device 1100 beacons is recording, and a third sound while recording device 1100 and all other recording devices are buffering. A sound, in particular the third sound, includes the sound of silence.

Haptic 1116 may provide any number of physical manifestations in any order and for any duration to provide information to a user. Haptic 1116 may vibrate recording device 1100 at a first rate while recording device 1100 is recording, at a second rate while recording device 1100 is buffering, but any other recording device that provides recording device 1100 beacons is recording, and at a third rate while recording device 1100 and all other recording devices are buffering. A vibration at a rate, in particular the third rate, includes the vibrating at a rate of zero (e.g., not vibrating).

Touch screen 1120 may present recording status to a user. Touch screen may present the recording state of recording device 1100. Touch screen may further present identifiers (e.g., serial numbers) for devices from which recording device 1100 receives beacons and the recording status of the recording devices. The recording devices may be presented as a list of recording devices with their respective recording status. Colors may be used to further indicate the recording status of a device. Touch screen 1120 may present information in an emphasized manner (e.g., color, intensity) when all recording devices are buffering or not recording.

Touch screen 1120, LED 1112, speaker 1114, and/or haptic 1116 may cooperate with each other in any manner to present the recording status information. Touch screen 1120, LED 1112, speaker 1114, and/or haptic 1116 may operate in any order or at the same time to present recording status to a user.

If recording status is received via alignment beacons, recording status may be stored with the information from the alignment beacons. During playback of recorded data, the recording status may be aligned with the recorded data and display with the recorded data. Playback of recorded data may be in such a manner that a person watching the playback can determine (e.g., visually, audibly) the recording status of cameras during the incident.

A server that receives event and alignment data from one or more recording devices is discussed above. Server 910 is an implementation of a server. Server 910 performs the functions of a server as discussed above. Server 910 includes detect device engine 912, align data engine 914, present data engine 916, processing circuit 918, communication circuit 920, and recorded data store 930.

Processing circuit 918 and communication circuit 920 perform the functions of a processing circuit and a communication circuit respectively as discussed above.

Recorded data store 930 includes data 940, data 950, and data 960. Data 940 stores event and alignment data from a first recording device (e.g., no. 1), data 950 stores event and alignment data from a second recording device (e.g., no. N), and data 960 stores data from a CCTV camera. Data 940 (data from recording device no. 1) through data 950 (data from recording device no. N) represent data stored for N devices which may be two or more without limit.

All data received and provided by server 910 may be received and transmitted by communication circuit 920 via network 970. As discussed above communication circuit 920 may communicate using any conventional communication protocol.

Data 940 includes event data 942, transmitted alignment data 944 (e.g., 500), received alignment data 946 (e.g., 600), and device serial number 948 of device no. 1.

Data 950 includes event data 952, transmitted alignment data 954 (e.g., 500), received alignment data 956 (e.g., 600), and device serial number 958 of device no. N.

Data 960 includes event data 962, received alignment data 964 (e.g., 600), and device serial number 966 of a CCTV camera. Server 910 may receive and store event and alignment data from more than one CCTV camera.

Recorded data store 930 may receive and store event data and alignment data for any number of recording devices. For example, the event and alignment data for recording devices A, C, D, E, H, F, K, G, M, R, T, and 730 discussed above may be received and stored in recorded data store 930. The data from each recording device may be stored separate from the data from all other recording devices. Data stored in recorded data store 930 may be organized in any manner such as by agency or by device serial number.

Event data 942, 952, and 962 may include event data as discussed above including event data 214, 244, 1010, and 1020.

Transmitted alignment data 944 and 954 may include alignment data 500 as discussed with respect to alignment data or beacons C1, C2 . . . , D1, D2 . . . , F1, F2 . . . , and so forth.

Received alignment data 946, 956, and 964 may include alignment data 600 as discussed with respect to alignment data or beacons C1, C2 . . . , D1, D2 . . . , F1, F2 . . . , and so forth.

Recorded data store 930 may store executable code (not shown) for execution by processing circuit 918, communication circuit 920, detect device engine 912, align data engine 914, and present data engine 916 to perform one or more functions of server 910.

Detect device engine 912 may perform the function of detecting related recording devices as discussed above with respect to FIG. 3 and the discussion with respect to recording devices F, K, G, and M. Server 910 may receive and detect device engine may use data from servers and/or computers of an agency, as discussed above, to determine relationships between recording devices. Detect device engine 912 may store information related to related devices for later use to avoid repeating identification of related devices. Information related to related devices may be stored in record data store 930 (not shown). Devices may be related for a period of time and/or for one or more events. Devices may not be related for other periods of time and/or other events. Detect device engine 912 may receive additional data from an agency, as discussed above, to perform the function of identifying related devices.

Processing circuit 918 executing a stored program may perform all or some of the functions of detect device engine 912.

Align data engine 914 may perform the functions discussed above for determining how to align event data from one recording device with the event data from one or more other recording devices. Align data engine 914 may perform the functions discussed with respect to FIG. 10 above to align event data. Align data engine 914 may access the transmit alignment data and/or the receive alignment data for any number of devices to determine the alignment between the event data of two or more devices. Align data engine 914 may receive information from detect device engine 912 to access the alignment data of related devices. Alignment data engine 914 may store information related to alignment for later use to avoid repeating an alignment operation. Information related to alignment may be stored in record data store 930.

Processing circuit 918 executing a stored program may perform all or some of the functions of align data engine 914.

Present data engine 916 performs the functions of presenting data in an aligned manner as discussed above. Present data engine 916 may use data determined and/or calculated by align data engine 914 and/or detect device engine 912 to present event data from two or more recording devices in an aligned manner. Present data engine 916 may present aligned data on a display for viewing and/or through a speaker for hearing. Present data engine 916 may present aligned data by creating a stored and aligned presentation for later viewing. Present data engine 916 may present the event data from the viewpoints of the one or more recording devices.

Processing circuit 918 executing a stored program may perform all or some of the functions of present data engine 916.

The term "engine" as used herein refers to, in general, circuitry, logic embodied in hardware and/or software instructions executable by a processor. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Logic embodied in (e.g., implemented as) software instructions may be written in any programming language, including but not limited to C, C++, COBOL, JAVA™, PHP, Perl, HTML, CSS, JavaScript, VBScript, ASPX, HDL, and/or Microsoft .NET™ programming languages such as C #. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as logic embedded in software may be stored in any type of computer-readable medium. An engine may be stored on and executed by one or more general purpose computers, thus creating a special purpose computer configured to perform the functions of (e.g., provide) the engine.

The devices and systems illustrated herein may include one or more processing circuits configured to perform the functions of one or more engines.

As understood by one of ordinary skill in the art, a "data store" as described herein may be any suitable device configured to store data for access by a processing circuit. A data store receives data. A data store retains (e.g., stores) data. A data store retrieves data. A data store provides data for use by a system, such as an engine. A data store may organize data for storage. A data store may organize data as a database for storage and/or retrieval. The operations of organizing data for storage in or retrieval from a database of a data store may be performed by a data store. A data store may store files that are not organized in a database. Data in a data store may be stored in a computer-readable medium. A data store may include one or more processing circuits for performing the functions of a data store.

One example of a data store suitable for use with the high capacity needs of a server such as server 910 is a highly reliable, high-speed relational database management system ("RDBMS") executing on one or more processing circuits and accessible over a high-speed network. However, any other suitable storage technique and/or devices capable of quickly and reliably providing the stored data in response to queries may be used, such as a key-value store and an object database.

Recorded data store 930 performs the functions of a data store discussed herein. A data store may be implemented using any computer-readable medium. An engine (e.g., 912, 914, 916) or processing circuit 918 of server 910 may access recorded data store 930 locally (e.g., via data bus), over a network, and/or as a cloud-based service.

In an example of a data store suitable for use with event and alignment data includes reliable storage but also low overhead as provided by a file system or database management system that stores data in files (or records) on a computer-readable medium such as flash memory, random access memory (RAM), or hard disk drives.

One of ordinary skill in the art will recognize that separate data stores may be combined into a single data store, and/or a single data store as discussed above may be separated into multiple data stores, without departing from the scope of the present disclosure.

The foregoing description discusses embodiments, which may be changed or modified without departing from the scope of the invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The location indicators "herein", "hereunder", "above", "below", or other word that refer to a location, whether specific or general, in the specification shall be construed to refer to any location in the specification whether the location is before or after the location indicator.

What is claimed is:

1. A recording device for recording an incident, the recording device comprising:
a processing circuit;
a communication circuit; and
a user interface; wherein:
the processing circuit determines a recording status of the recording device;
the communication circuit receives via wireless communication one or more beacons from one or more other recording devices, the one or more beacons include a recording status of the one or more other recording devices respectively; and
the processing circuit provides an information regarding the recording status of the recording device and the recording status of the one or more other recording devices respectively via the user interface, the information includes:
a first indicia while the recording device is not recording and at least one of the one or more other recording devices is recording; and
a second indicia while the recording device is not recording and all of the one or more other recording devices are not recording.

2. The recording device of claim 1 wherein at least one of the recording status of the recording device and the recording status of the one or more other recording devices respectively comprises recording and buffering.

3. The recording device of claim 1 wherein the user interface provides the first indicia and the second indicia of the information regarding the recording status of the recording device and the recording status of the one or more other recording devices respectively as at least one of visual, audio, or haptic information.

4. The recording device of claim 1 wherein:
the user interface includes a light emitting diode ("LED"); and
while the recording status of the recording device is recording, the LED emits a red light.

5. The recording device of claim 1 wherein:
the user interface includes a light emitting diode ("LED"); and
while the recording status of the recording device is one of buffering and not recording and the recording status of any one of the one or more other recording devices respectively is recording, the LED emits a yellow light.

6. The recording device of claim 1 wherein:
the user interface includes a light emitting diode ("LED"); and
while the recording status of the recording device and all of the one or more other recording devices respectively is not recording, the LED emits a green light.

7. The recording device of claim 1 wherein:
the user interface includes a light emitting diode ("LED");
while the recording status of the recording device is recording, the LED emits a red light;

while the recording status of the recording device is not recording and the recording status of any one of the one or more other recording devices respectively is recording, the LED emits a yellow light; and while the recording status of the recording device and all of the one or more other recording devices respectively is not recording, the LED emits a green light.

8. The recording device of claim 1 wherein the one or more beacons are alignment beacons.

9. The recording device of claim 1 wherein the information further includes a third indicia while the first recording device is recording.

10. A method for reporting a recording status of a first recording device and a second recording device, the method performed by the first recording device, the method comprising:
- detecting a first recording status of the first recording device;
- receiving via wireless communication a beacon from the second recording device, the beacon includes a second recording status of the second recording device; and
- reporting an information regarding the recording status of the first recording device and the second recording device in accordance with the first recording status and the second recording status, the information includes a first indicia that indicates the first recording device is not recording and the second recording device is not recording.

11. The method of claim 10 wherein the first recording status comprises recording and buffering; and
the second recording status comprises recording and buffering.

12. The method of claim 10 wherein reporting comprises providing at least one of a visual display, an audible sound, and a haptic sensation in accordance with the first indicia.

13. The method of claim 10 wherein the information further includes a second indicia that indicates the first recording device is not recording and the second recording device is recording.

14. The method of claim 13 wherein:
- responsive to the first indicia, a user interface provides at least one of a first visual display, a first audible sound, and a first haptic sensation;
- responsive to the second indicia, the user interface provides at least one of a second visual display, a second audible sound, and a second haptic sensation; and
- the first visual display, the first audible sound, and the first haptic sensation are different from the second visual display, the second audible sound, and the second haptic sensation respectively.

15. The method of claim 10 wherein the information further includes a third indicia that indicates the first recording device is recording.

16. The method of claim 10 wherein:
the information further includes:
- a second indicia that indicates the first recording device is not recording and the second recording device is recording; and
- a third indicia that indicates the first recording device is recording; and reporting comprises providing at least one of a visual display, an audible sound, and a haptic sensation in accordance with the first indicia, the second indicia, and the third indicia.

17. A recording device for recording an incident, the recording device comprising:
a processing circuit;
a communication circuit; wherein:
- the processing circuit determines a recording status of the recording device;
- the communication circuit receives via wireless communication one or more beacons from one or more other recording devices, the beacons include information regarding a recording status of the one or more other recording devices respectively; and
- the processing circuit provides:
- a first signal while the recording status of the recording device is not recording and the recording status of the one or more other recording devices respectively is recording; and
- a second signal while the recording status of the recording device is not recording and the recording status of the one or more other recording devices respectively is not recording.

18. The recording device of claim 17 wherein the processing circuit further provides
a third signal while the recording status of the recording device is recording.

19. The recording device of claim 18 further comprising a user interface, wherein:
- at least one of the first signal, the second signal, and the third signal generates a first report, a second report, and a third report respectively via the user interface, each report comprises at least one of a visual display, an audible sound, or a haptic sensation; and
- the first report, the second report, and the third report are different.

20. The recording device of claim 17 further comprising a user interface, wherein the first signal generates at least one of a visual display, an audible sound, or a haptic sensation via the user interface.

* * * * *